United States Patent
Favilla et al.

(10) Patent No.: US 9,573,198 B1
(45) Date of Patent: Feb. 21, 2017

(54) DOUBLE ECCENTRIC POSITIONING APPARATUS

(71) Applicant: The Boeing Company, Chicago, IL (US)

(72) Inventors: Stephan J. Favilla, Monroe, WA (US); Alan Ray Merkley, Greenbank, WA (US); Christie Dusty Lagally, Seattle, WA (US); Ronald J. Collins, Brier, WA (US)

(73) Assignee: The Boeing Company, Chicago, IL (US)

(*) Notice: Subject to any disclaimer, the term of this patent is extended or adjusted under 35 U.S.C. 154(b) by 837 days.

(21) Appl. No.: 14/016,709

(22) Filed: Sep. 3, 2013

Related U.S. Application Data

(60) Provisional application No. 61/832,084, filed on Jun. 6, 2013.

(51) Int. Cl.
| | |
|---|---|
| *G06F 19/00* | (2011.01) |
| *G05B 11/01* | (2006.01) |
| *G05B 13/02* | (2006.01) |
| *B23B 39/06* | (2006.01) |
| *B23B 49/02* | (2006.01) |
| *F16H 37/04* | (2006.01) |

(52) U.S. Cl.
CPC ......... *B23B 49/023* (2013.01); *F16H 37/041* (2013.01)

(58) Field of Classification Search
CPC .............................. B23B 49/023; F16H 37/041
USPC .................. 408/13; 700/23, 32, 170; 400/13
See application file for complete search history.

(56) References Cited

U.S. PATENT DOCUMENTS

| | | | |
|---|---|---|---|
| 5,318,394 A | 6/1994 | Pierce et al. | |
| 5,353,884 A | 10/1994 | Misawa et al. | |
| 5,542,796 A * | 8/1996 | Bratten | B23B 41/00 |
| | | | 29/897.2 |
| 5,560,102 A | 10/1996 | Micale et al. | |
| 5,875,859 A | 3/1999 | Ikeda et al. | |
| 6,550,129 B1 | 4/2003 | Buttrick, Jr. | |
| 6,618,505 B2 | 9/2003 | Cork et al. | |
| 6,808,143 B2 | 10/2004 | Munk et al. | |
| 6,922,599 B2 | 7/2005 | Richey | |
| 7,195,429 B2 | 3/2007 | Dods et al. | |
| 7,214,008 B1 | 5/2007 | Dods et al. | |
| 7,614,159 B2 | 11/2009 | Kilwin et al. | |
| 7,974,722 B2 | 7/2011 | Boyl-Davis et al. | |
| 8,043,033 B2 | 10/2011 | Clark | |

(Continued)

*Primary Examiner* — Robert Fennema
*Assistant Examiner* — Thomas Stevens
(74) *Attorney, Agent, or Firm* — Ostrager Chong Flaherty & Broitman P.C.

(57) ABSTRACT

A double eccentric positioning apparatus uses two equal offset eccentric bushings to accurately position a tool in two dimensions. Miniature servo motors and precise gearing control the rotation of each eccentric bushing, which controls the direction of the offset vectors. The offset vectors are used to determine the final position of the drill bushing. The desired rotation angles can be mathematically calculated based on desired position. The inner eccentric bushing is located concentric to the offset of the outer eccentric bushing. This allows any position, within a radius of two times the eccentric offset, to be achieved. The use of worm gearing on the eccentric bushings prevents back-driving of the servo motors, due to the lead angle of the worm gears, and the friction between the worm wheel and worm gear.

12 Claims, 29 Drawing Sheets

(56) References Cited

U.S. PATENT DOCUMENTS

| | | | |
|---|---|---|---|
| 8,382,475 B2* | 2/2013 | Stein | 433/75 |
| 2003/0010534 A1* | 1/2003 | Chen | E21B 7/067 |
| | | | 175/61 |
| 2004/0191017 A1 | 9/2004 | Erickson et al. | |
| 2006/0104729 A1* | 5/2006 | Nader | B23B 47/287 |
| | | | 408/1 R |
| 2008/0112768 A1* | 5/2008 | Matlack | B23B 47/34 |
| | | | 408/1 BD |
| 2008/0289207 A1 | 11/2008 | Schmier et al. | |
| 2009/0022556 A1* | 1/2009 | Clark | B23Q 3/183 |
| | | | 408/13 |
| 2009/0269153 A1 | 10/2009 | Schevers et al. | |
| 2010/0309483 A1* | 12/2010 | Crowther | B25B 5/06 |
| | | | 356/606 |
| 2012/0316666 A1 | 12/2012 | Boyl-Davis et al. | |

\* cited by examiner

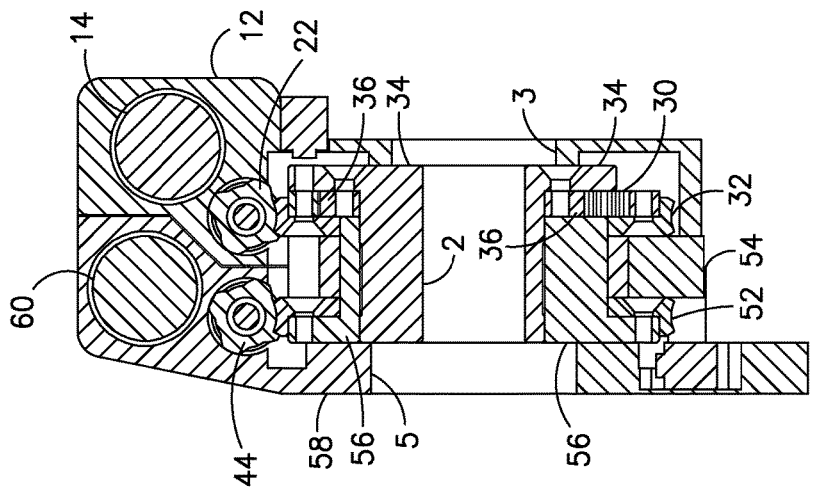
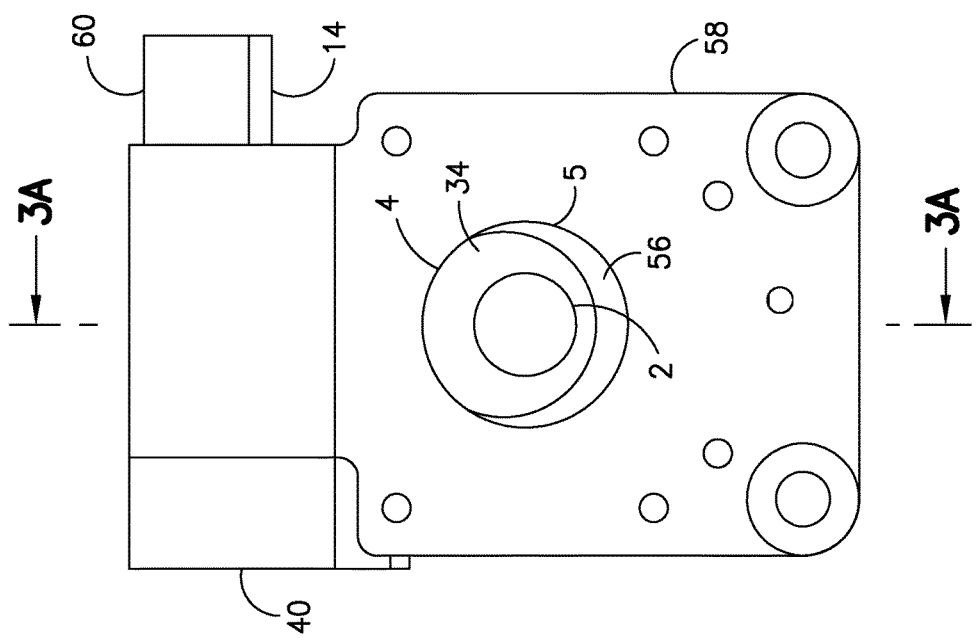

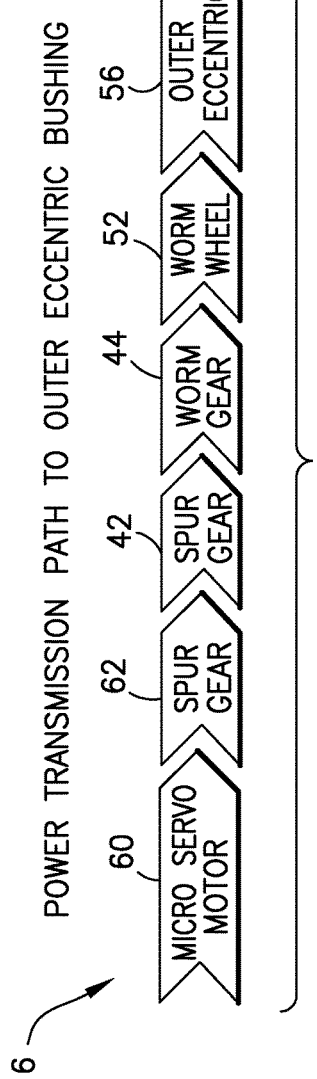
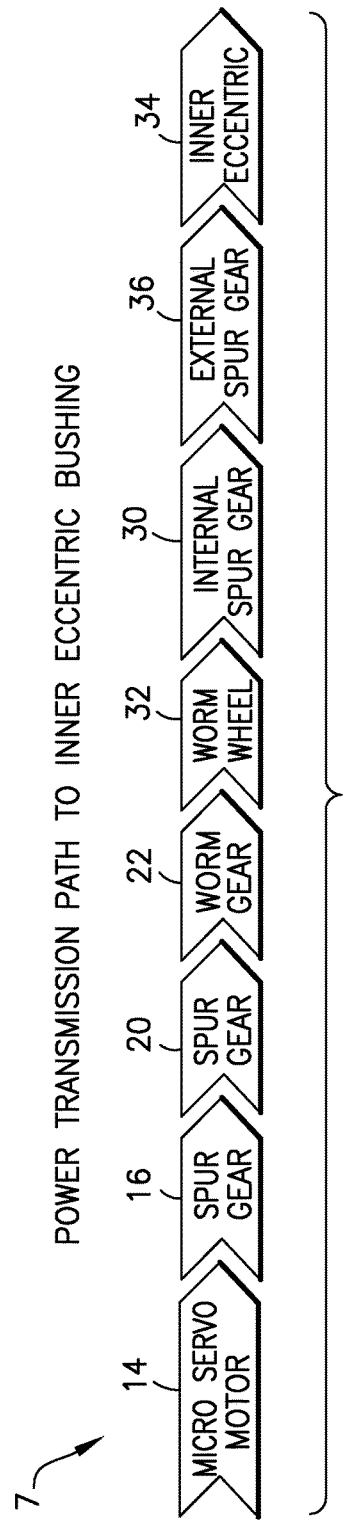

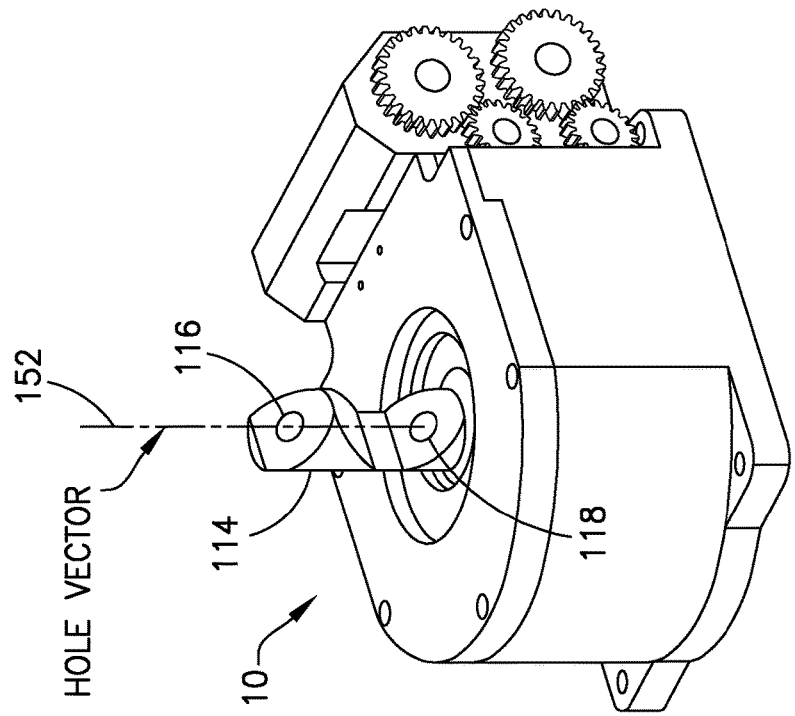
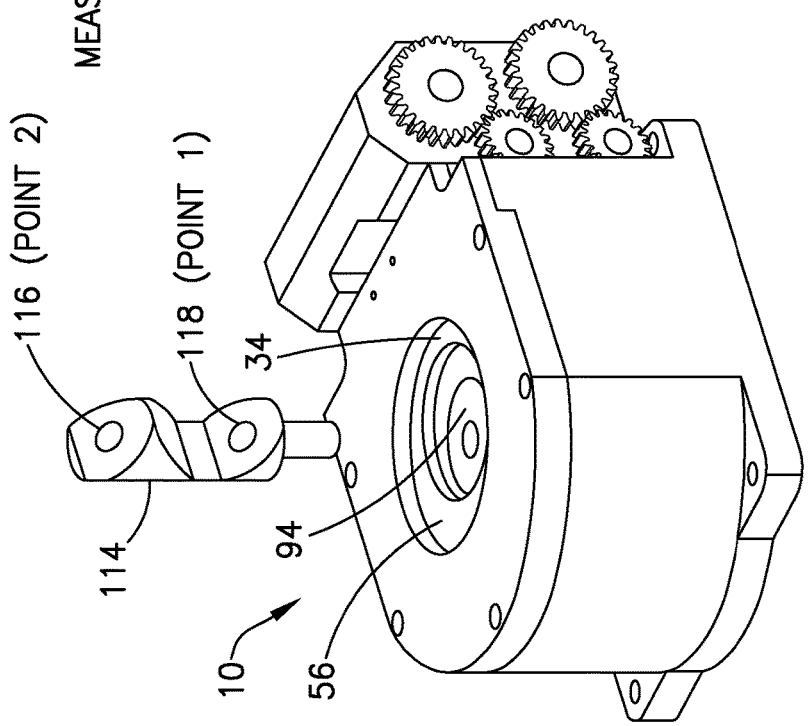
FIG.16B
FIG.16A

FIG.18A                    FIG.18

DOUBLE ECCENTRIC POSITIONING APPARATUS

RELATED PATENT APPLICATION

This application claims the benefit, under Title 35, United States Code, §119(e), of U.S. Provisional Application No. 61/832,084 filed on Jun. 6, 2013.

BACKGROUND

The present disclosure relates generally to drilling holes in large production parts such as those constructed and assembled for aircraft or ships.

When assembling large component parts, such as during aircraft assembly or ship building, typically holes are drilled at various locations in the large parts. Such holes may be referred to as coordination holes because they are used to coordinate the indexing of one component relative to another. Corresponding coordination holes in respective parts also receive fasteners for affixing one part to another part. Each time the same part is replicated, coordination holes must be measured and drilled in the same locations, often requiring precise measurements and accuracy of drilling.

A traditional method of achieving the accuracy for drilling coordination holes in large parts involves using large numerically controlled machines on massive foundations in large controlled environments. Massive foundations are required to achieve stiffness and accuracy for drilling. Large numerically controlled machines operate in five axes to properly locate and orient the holes to be formed in the parts. These machines are also expensive, difficult to set up, not easily moved, and hard to modify. In addition, the weight of a machine and the large work space decrease the accuracy of drilling. In effect, the traditional method of drilling coordination holes in large parts is inflexible.

In addition, the traditional method of drilling coordination holes, using a large numerically controlled machine on a massive foundation, is not suited for drilling coordination holes in higher-level assemblies, such as wing boxes and assembled structures, in part, due to the machine's inability to access smaller or internal recesses and to difficulties in fixturing and indexing large assemblies. Many types of large parts must be drilled to produce coordination holes. Configuring and adapting a large numerically controlled machine for many different parts is time consuming and labor intensive, making using a large numerically controlled machine on a massive foundation an impracticable solution for drilling coordination holes in many types of parts.

In many industries, it is difficult to replace existing components with newer ones due to the difficulty in accurately aligning and drilling mounting holes in the newer component. This is especially true in the aerospace industry. In general, aerospace personnel have difficulty in properly aligning and drilling mounting holes in new components such as aircraft skins when replacing existing ones. For large production runs, special production tools may be designed to properly align and form the mounting holes on new components. However, these production tools can be expensive to design and build. Thus, for limited or small production runs, these production tools are cost prohibitive.

Determinate assembly (DA) is a method of aligning parts using mating physical features. Typically, coordinating holes which are placed on each part or structure are used to take advantage of the ability to install temporary fasteners to hold the parts together. Determinate assembly holes are typically installed on a part or structure during production or via a CNC mill onto a part that is properly indexed in a jig so hole installation is accurate. There are three major challenges to drilling and using DA holes, particularly in large, built-up structures such as wings. First, DA holes are accompanied by inherent reference or indexing tolerance. Tolerance build-up, especially in large parts or in assemblies, can cause DA to be ineffective, particularly when used in large assembly indexing. Second, DA hole placement on parts may not be feasible for built-up structures or for parts that cannot be fixtured properly or easily in a CNC mill (i.e., a wing, wing panel, or fuselage section). For large assemblies where parts are placed relative to one another, DA holes cannot be placed ahead of time because the correct location is not yet known. Lastly, large surfaces (such as a fuselage, wing panel, etc.) can flex during installation or the surface definition may vary considerably and deviate from engineering nominal. Any drill jig applied to the surface without consideration of the as-built surface variation, results in holes with the additional error from jig placement on the as-built surface.

In addition, fixed tooling generally cannot adapt to fluctuations in parts. These differences from nominal dimensions drive errors in tooling position, which cause the operations performed by the tool to also have an error. Some existing solutions include X-Y tables and single eccentric positioners. X-Y tables move in two dimensions, and can reach anywhere within a rectangle defined by the limits of each axis. Typically, X-Y tables are not provisioned to have a hole through the center, which makes mounting a drill bushing cumbersome, and reduces the rigidity when the bushing is mounted on one side. Also, the size of the table is rather large since the axes are coupled, which requires one axis to be placed on top of the other, increasing the height of the table. A single eccentric positioner is only able to achieve positions on a circle, with the radius defined by the offset of the eccentric. Also, rotation of the eccentric has proven to be problematic as torque from drilling can cause the eccentric to rotate, changing the position of the bushing.

There is a continuing need for improvements in means and methods for achieving accurate planar positioning of a tool (such as a drill) within a small envelope. In particular, there is a need for flexible tooling that can adapt to the changes in part features.

SUMMARY

The subject matter disclosed herein is directed to a double eccentric positioning apparatus that solves the problems of accurate planar positioning within a small envelope. By using flexible tooling that can adapt to the changes in part features, the errors in the part can be taken into account when performing the operations. The use of the double eccentric positioning apparatus allows tooling and hole positions to be adjusted back to nominal, improving the end result. The double eccentric positioning apparatus disclosed herein uses two equal offset eccentric bushings to accurately position a tool (such as a drill bushing) in two dimensions. Miniature servo motors and precise gearing control the rotation of each eccentric bushing, which controls the direction of the offset vectors. The offset vectors are used to determine the final position of the drill bushing. The desired rotation angles can be mathematically calculated based on desired position; conversely, the desired position can be calculated based on desired rotation angles.

The positioning apparatus disclosed herein comprises two eccentric bushings, with the inner eccentric bushing located concentric to the offset of the outer eccentric bushing. This allows any position, within a radius of two times the offset, to be achieved. By placing the inner eccentric bushing within the outer eccentric bushing, the design is very compact and rigid. The motor transmitting power to the inner eccentric bushing is decoupled from the rotation of the outer eccentric bushing by the use of gearing resembling a spirograph. This feature allows the inner motor to drive the inner eccentric bushing from a stationary location common to the outer motor, reducing the size of the design, and resolving the issues of driving the eccentric bushings with servo motors. The use of worm gearing on the eccentric bushings prevents back-driving of the servo motors, due to the worm gear lead angle and friction between the mating gears. This locks the bushings into place after positioning, resolving an issue plaguing previous eccentric positioners, and allowing the use of smaller servo motors. The eccentric bushings also act like cams, which yields very high reduction ratios, requiring less power and gearing to move more mass.

The double eccentric positioning apparatus can be used by any company working with tooling, or in any industry that requires precise two-dimensional positioning in a small envelope. The design is easily scaled for the desired range of motion, and can be used for multiple operations. The double eccentric positioning apparatus disclosed herein will allow flexible tooling to become a viable alternative to large monuments and fixed tooling, reducing cost and the footprint of the operation. The device also has uses in other applications as the design can be scaled to fit the requirements, such as positioning parts or assemblies.

One aspect of the subject matter disclosed herein is an apparatus comprising: an outer eccentric bushing having an outer circular cylindrical surface and an inner circular cylindrical surface off-center from the outer circular cylindrical surface of the outer eccentric bushing; a first worm wheel affixed to the outer eccentric bushing; an inner eccentric bushing having an outer circular cylindrical surface in contact with the inner circular cylindrical surface of the outer eccentric bushing and an inner circular cylindrical surface off-center from the outer circular cylindrical surface of the inner eccentric bushing; an external spur gear affixed to the inner eccentric bushing, the external spur gear having an axis which is coaxial with an axis of the outer circular cylindrical surface of the inner eccentric bushing; an internal spur gear surrounding and engaging the external spur gear, the internal spur gear having an axis which is coaxial with an axis of the outer circular cylindrical surface of the outer eccentric bushing; and a second worm wheel affixed to the internal spur gear. In accordance with one implementation, the offsets of the inner and outer eccentric bushings are equal. The apparatus may further comprise: a first worm gear engaged with the first worm wheel; a second worm gear engaged with the second worm wheel; a first motor having an output shaft; a first spur gear affixed to the output shaft of the first motor; a second spur gear engaged with the first spur gear and coupled to the first worm gear; a second motor having an output shaft; a third spur gear affixed to the output shaft of the second motor; and a fourth spur gear engaged with the third spur gear and coupled to the second worm gear. In accordance with a further aspect, the apparatus comprises: a housing assembly which houses the inner and outer eccentric bushings, the first and second worm wheels, and the external and internal spur gears; a base plate that supports the housing assembly; and a clamping device for clamping the base plate to a work piece.

Another aspect of the subject matter disclosed herein is a system comprising: a double eccentric positioning apparatus having a hole with an axis, the double eccentric positioning apparatus comprising a first motor which operates in accordance with received first motor encoder counts and a second motor which operates in accordance with received second motor encoder counts; a vector target comprising a body supported by the double eccentric positioning apparatus, and first and second optical targets supported by the body, an axis of the first and second optical targets being coaxial with the axis of the double eccentric positioning apparatus; an optical coordinate measuring machine operable to measure coordinates of a measured hole vector based in part on light received from the first and second optical targets, the measured hole vector representing a location of the axis of the double eccentric positioning apparatus in a global coordinate system; and a computer system programmed to perform the following operations: convert the location of the axis of the double eccentric positioning apparatus in the global coordinate system into a location of the axis of the double eccentric positioning apparatus in a bushing coordinate system; computing a distance to move the axis of the double eccentric positioning apparatus in the bushing coordinate system; and converting the distance into the first and second motor counts.

A further aspect is a method of positioning a drill bushing in overlying relationship with a nominal drillhole location on a workpiece, comprising: installing a drill bushing in a double eccentric positioning apparatus so that an axis of the drill bushing is coaxial with an axis of the double eccentric positioning apparatus; positioning the double eccentric positioning apparatus on a workpiece at a location whereat a nominal drill hole location lies within a range of movement of the axis of the double eccentric positioning apparatus; and controlling the double eccentric positioning apparatus so that the axis of the double eccentric positioning apparatus moves closer to the nominal drillhole location. In accordance with one implementation, the controlling step is performed by a computer system programmed to output first and second motor encoder counts that cause the axis of the double eccentric positioning apparatus to move closer to the nominal drillhole location. An outer eccentric bushing of the double eccentric positioning apparatus is rotated a first angle proportional to the first motor encoder count, and an inner eccentric bushing of the double eccentric positioning apparatus is rotated a second angle proportional to the second motor encoder count. The method may further comprise: (a) installing a vector target in the drill bushing, the vector target comprising first and second optical targets, an axis of the first and second optical targets being coaxial with the axis of the double eccentric positioning apparatus; (b) measuring the coordinates of a measured hole vector based in part on light transmitted toward and reflected from the first and second optical targets, the measured hole vector representing a location of the axis of the double eccentric positioning apparatus in a global coordinate system; (c) converting the location of the axis of the double eccentric positioning apparatus in the global coordinate system into a location of the axis of the double eccentric positioning apparatus in a bushing coordinate system; (d) computing a distance to move the axis of the double eccentric positioning apparatus in the bushing coordinate system; and (e) converting the distance into the first and second motor counts, wherein steps (c) through (e) are performed by the computer.

Other aspects are disclosed in detail and claimed below.

BRIEF DESCRIPTION OF THE DRAWINGS

FIG. 3 is a schematic bottom view of the double eccentric positioning apparatus depicted in FIG. 1.

FIG. 3A is a diagram representing a sectional view of the double eccentric positioning apparatus depicted in FIG. 1, the section line being taken along line 3A-3A shown in FIG. 3.

FIGS. 6A and 6B are diagrams showing the respective power transmission paths for the outer eccentric bushing (FIG. 6A) and the inner eccentric bushing (FIG. 6B) of the double eccentric positioning apparatus depicted in FIG. 1.

FIG. 11 is a diagram showing vector addition of the inner and outer offset vectors shown in FIG. 10, the resulting vector extending from the origin to the point to where the axis of the inner eccentric bushing will be moved to.

FIGS. 16A and 16B are schematic isometric views showing a vector target above (FIG. 16A) and installed inside (FIG. 16B) the double eccentric positioning apparatus depicted in FIG. 1. The dashed line through the vector target in FIG. 16B represents the measured hole vector.

Reference will hereinafter be made to the drawings in which similar elements in different drawings bear the same reference numerals.

DETAILED DESCRIPTION

As used herein, the term "drilling" encompasses traditional drilling as well as other forms of cutting or milling, such as helical milling, pocketing, ramping, slotting, and shoulder milling. Similarly, the term "hole" as used herein should be construed broadly to include multiple species, such as drill holes and recesses formed by a cutting or milling tool. This lexicon is selected as a convenient means to describe and explain various embodiments and is not intended to limit the application of the teachings herein to traditional drilling.

While a primary use of the embodiments disclosed herein is in the field of aircraft construction and assembly, the teachings herein have application in other types of construction and assembly, including, for example, shipbuilding, automobile manufacture, building construction and the like.

Figure 1:
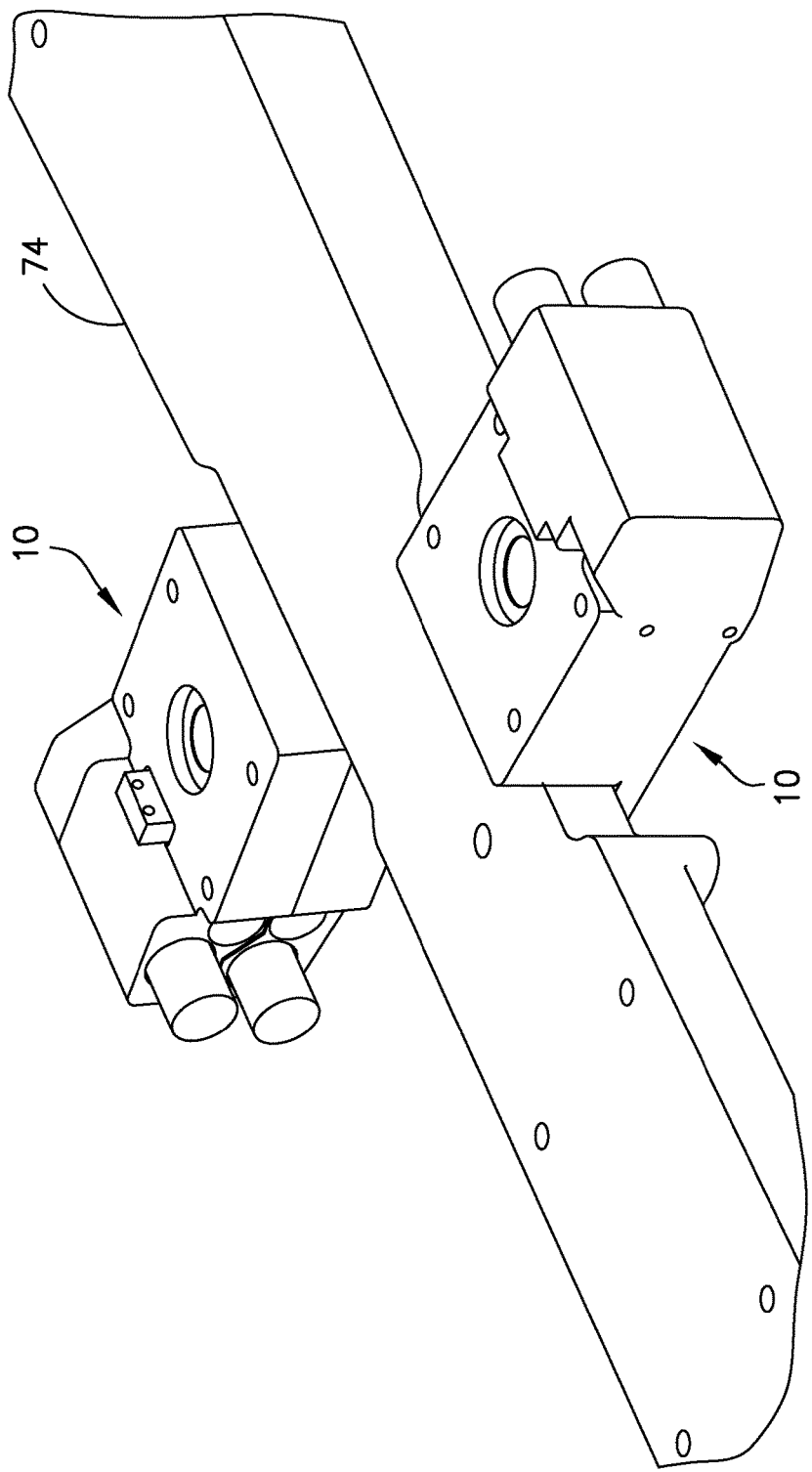
FIG. 1 is a schematic isometric view of a pair of double eccentric positioning apparatus installed on a lightweight drill jig (only a portion of which is shown) in accordance with one embodiment.
Figure 17:
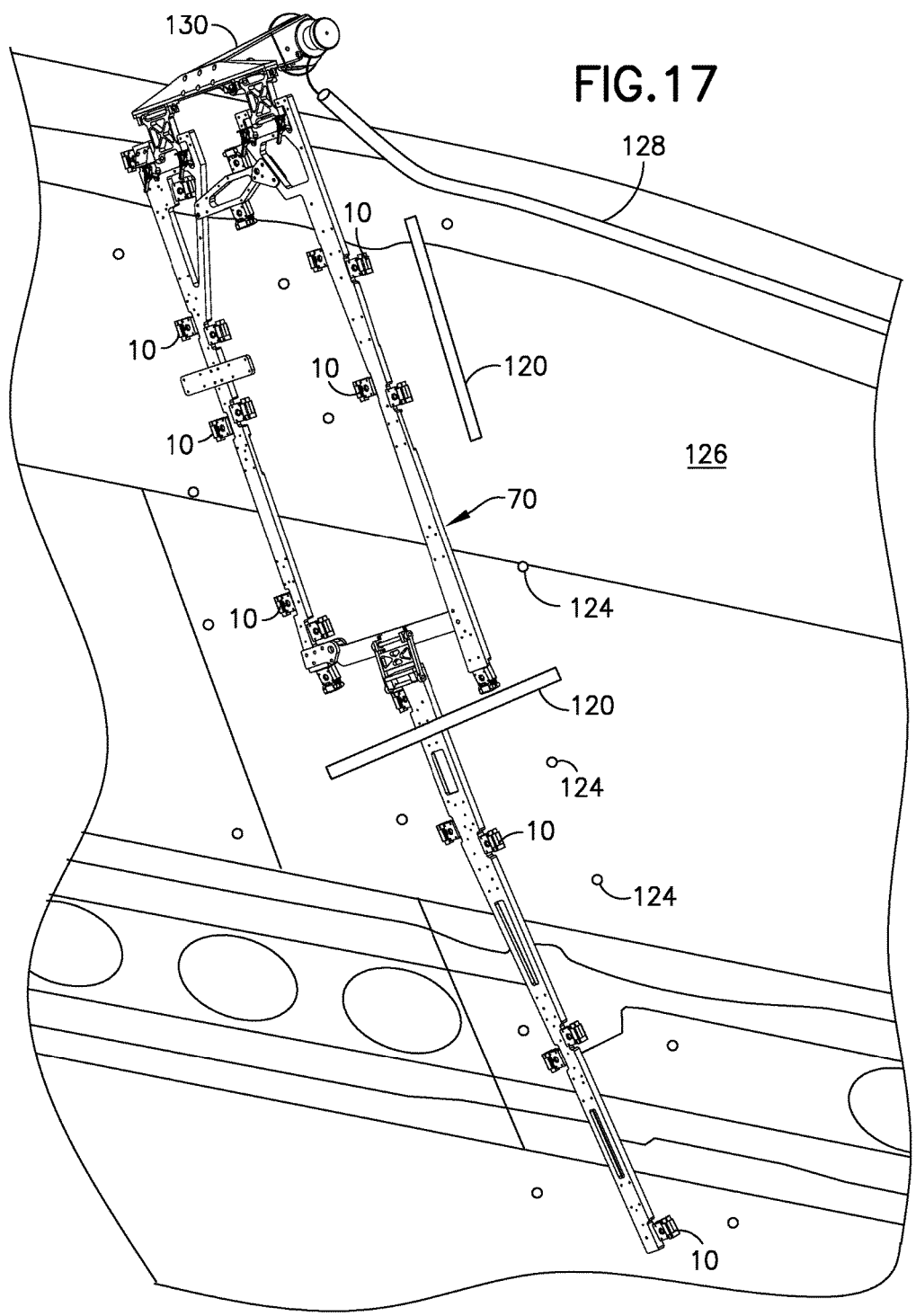
FIG. 17 is a schematic isometric view of a multiplicity of adjustable bushing drill jigs installed on a lightweight drill jig for rough placement on a wingbox in accordance with one embodiment.

FIG. 1 shows a pair of double eccentric positioning apparatus 10 bolted to a backbone 74 of a drill jig (item 70 in FIG. 17). As will be explained in more detail later, the drill jig 70 is configured such that when it is clamped to the part to be drilled, it provides a rough placement of the axis of each double eccentric positioning apparatus 10 (see, e.g., measured hole vector 152 in FIG. 20A) near a nominal hole vector (see, e.g., nominal hole vector 150 in FIG. 20A). Fine positioning is achieved by means of the double eccentric positioning apparatus 10, which can be controlled to move its own axis (i.e., the axis of an inner eccentric bushing which receives a drill bushing) to intersect the part at a nominal intersect point corresponding to the DA hole to be drilled.

Figure 2:
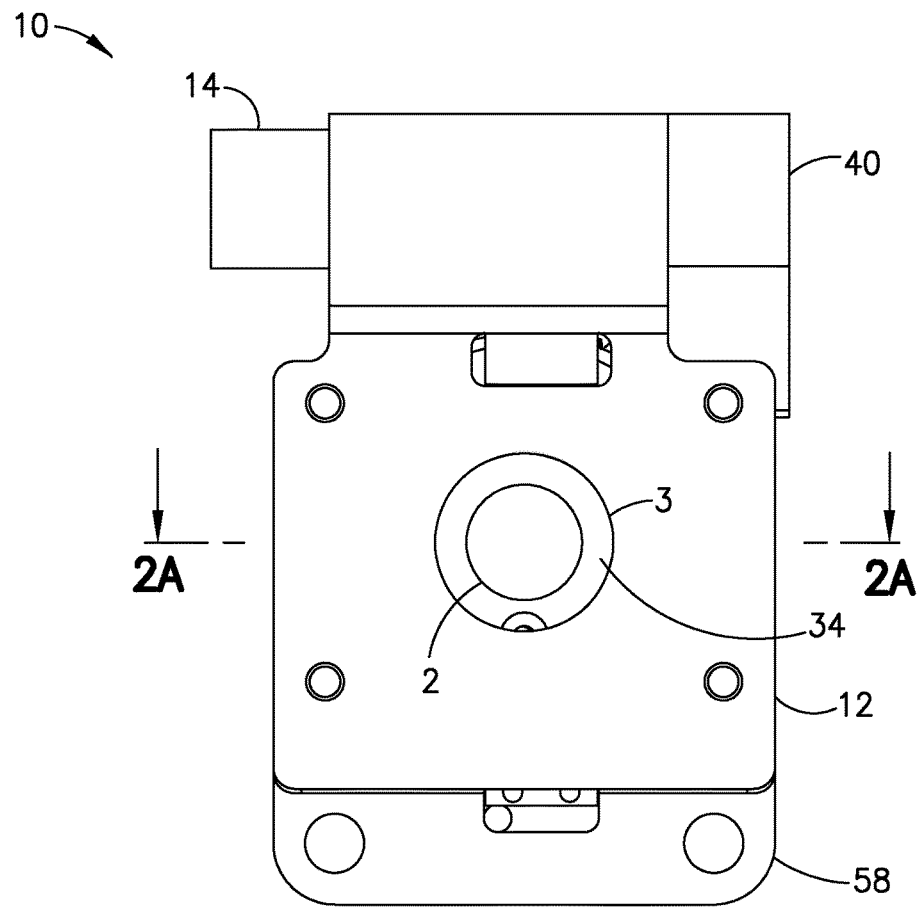
FIG. 2 is a schematic top view of the double eccentric positioning apparatus depicted in FIG. 1.
Figure 2A:
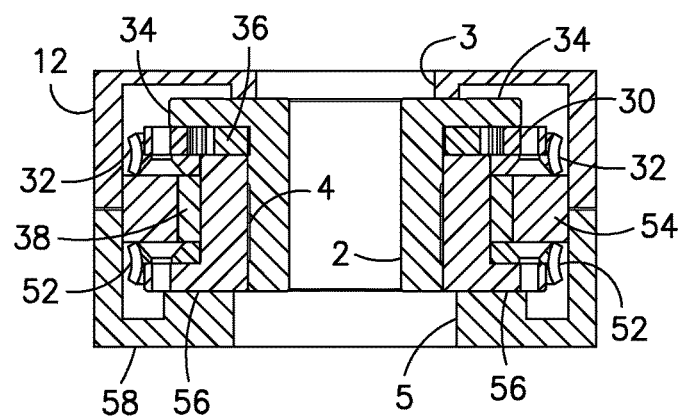
FIG. 2A is a diagram representing a sectional view of the double eccentric positioning apparatus depicted in FIG. 1, the section line being taken along line 2A-2A shown in FIG. 2.

FIG. 2 is a schematic top view and FIG. 2A is a sectional view of the double eccentric positioning apparatus 10 depicted in FIG. 1, the section line being taken along line 2A-2A shown in FIG. 2. Referring to FIG. 2, the double eccentric positioning apparatus 10 comprises a top housing 12 and a bottom housing 58. The top housing 12 has a circular opening 3 which overlies a circular cylindrical hole 2 of an inner eccentric bushing 34 (best seen in FIG. 2A). As seen in FIG. 2, the bottom housing 58 extends beyond the top housing 12 in one direction. Other components visible in FIG. 2 include a first micro servo motor 14 which is an element of the power transmission path to the inner eccentric bushing 34 (see power transmission path 7 in FIG. 6B), and a gear cover 40 which cover the spur gears (to be described later with reference to FIG. 4). The first micro servo motor 14 is supported by top housing 12.

As best seen in FIG. 2A, the double eccentric positioning apparatus comprises an inner eccentric bushing 34 and an outer eccentric bushing 56. The inner eccentric bushing 34 is located concentric to the offset of the outer eccentric bushing 56. The two eccentric bushings 34, 56 have equal offsets to accurately position a tool (such as a drill bushing) in two dimensions. This allows any position, within a radius of two times the offset, to be achieved. By placing the inner eccentric bushing 34 within the outer eccentric bushing 56, the design is very compact and rigid.

Figure 5:
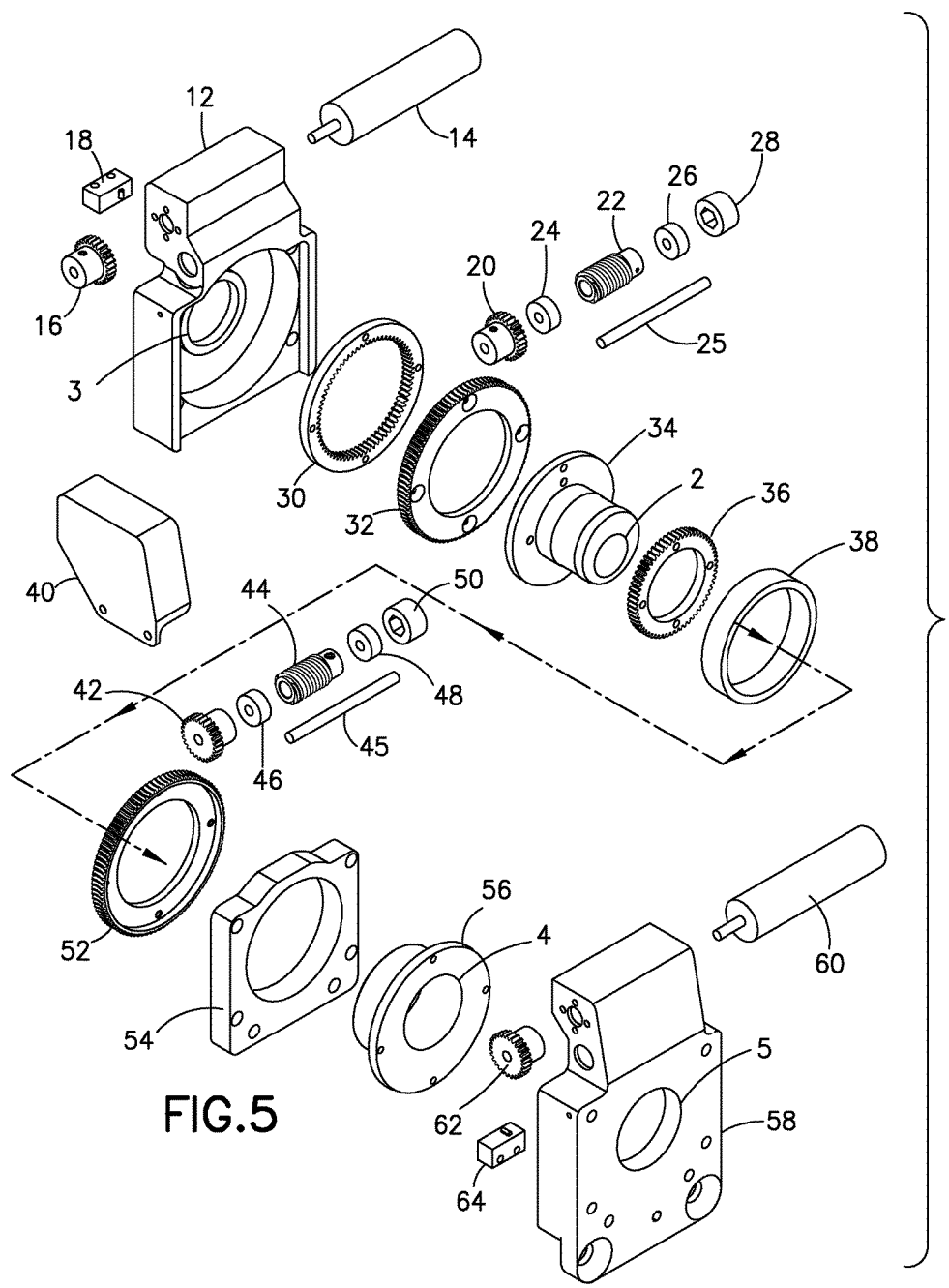
FIG. 5 is an exploded view showing disassembled components of the double eccentric positioning apparatus depicted in FIG. 1.

The eccentric bushings 34, 56 are supported inside housings 12 and 58. The top housing 12 has a circular opening 3 which overlies a circular opening 5 formed in the bottom housing 58. Opening 3 in top housing 12 communicates with opening 5 in bottom housing 58 by means of the circular cylindrical hole 2 of the inner eccentric bushing 34. A major portion of inner eccentric bushing 34 is seated in a circular cylindrical hole 4 of the outer eccentric bushing 56. The inner and outer eccentric bearings 34, 56 are rotatably mounted inside the housings 12, 58 and are rotatable relative to each other. As seen in FIG. 2A, the outer eccentric bushing 56 is seated on a circular portion of bottom housing 58 and is held in place by a center bushing 38, which in turn is surrounded by a bushing plate 54. The bushing plate 54 locates the outer eccentric bushing 56 in the housings 12, 58. The shapes of inner eccentric bushing 34, outer eccentric bushing 56, center bushing 38, bushing plate 54, top housing 12 and bottom housing 58 can be seen in FIG. 5.

Other elements which are visible in FIG. 2A include the following elements of the power transmission path to the inner eccentric bushing 34 (see power transmission path 7 in FIG. 6B): an external spur gear 36 which is fastened to the inner eccentric bushing 34 such that they rotate together; an internal spur gear 30 which meshes with the external spur gear 36; and a worm wheel 32 which is fastened to the internal spur gear 30 such that they rotate together. In accordance with this arrangement, the inner eccentric bushing 34 will rotate when the worm wheel 32 is rotated. Finally, FIG. 2A also shows a sectional view of an element of the power transmission path to the outer eccentric bushing 56 (see power transmission path 6 in FIG. 6A), namely, worm wheel 52.

FIG. 3 is a schematic bottom view and FIG. 3A is a sectional view of the double eccentric positioning apparatus depicted in FIG. 1. The bottom housing 58 has a circular opening 5. A portion of circular cylindrical hole 4 of outer eccentric bushing 56 is visible in FIG. 3 through the opening 5. The circular cylindrical hole 2 of inner eccentric bushing 34 is also visible in FIG. 3. Also visible in FIG. 3 is a portion of a second micro servo motor 60, which is an element of the power transmission path to the outer eccentric bushing 56 (see power transmission path 6 in FIG. 6A). The second micro servo motor 60 is supported by bottom housing 58.

Additional elements of the power transmission paths to the inner and outer eccentric bushings 34, 56 are visible in the sectional view of FIG. 3A. A worm gear 44 engages a worm wheel 52. Worm gear 44 is part of the power transmission path 6 to the outer eccentric bushing 56. A worm gear 22 engages a worm wheel 32. Worm gear 22 is part of the power transmission path 7 to the inner eccentric bushing 34. The use of worm gearing on the eccentric bushings 34, 56 prevents back-driving of the first and second micro servo motors 14, 60 due to the worm gear lead angle and friction between each worm gear 22, 44 and respective worm wheel 32, 52.

Figure 4:
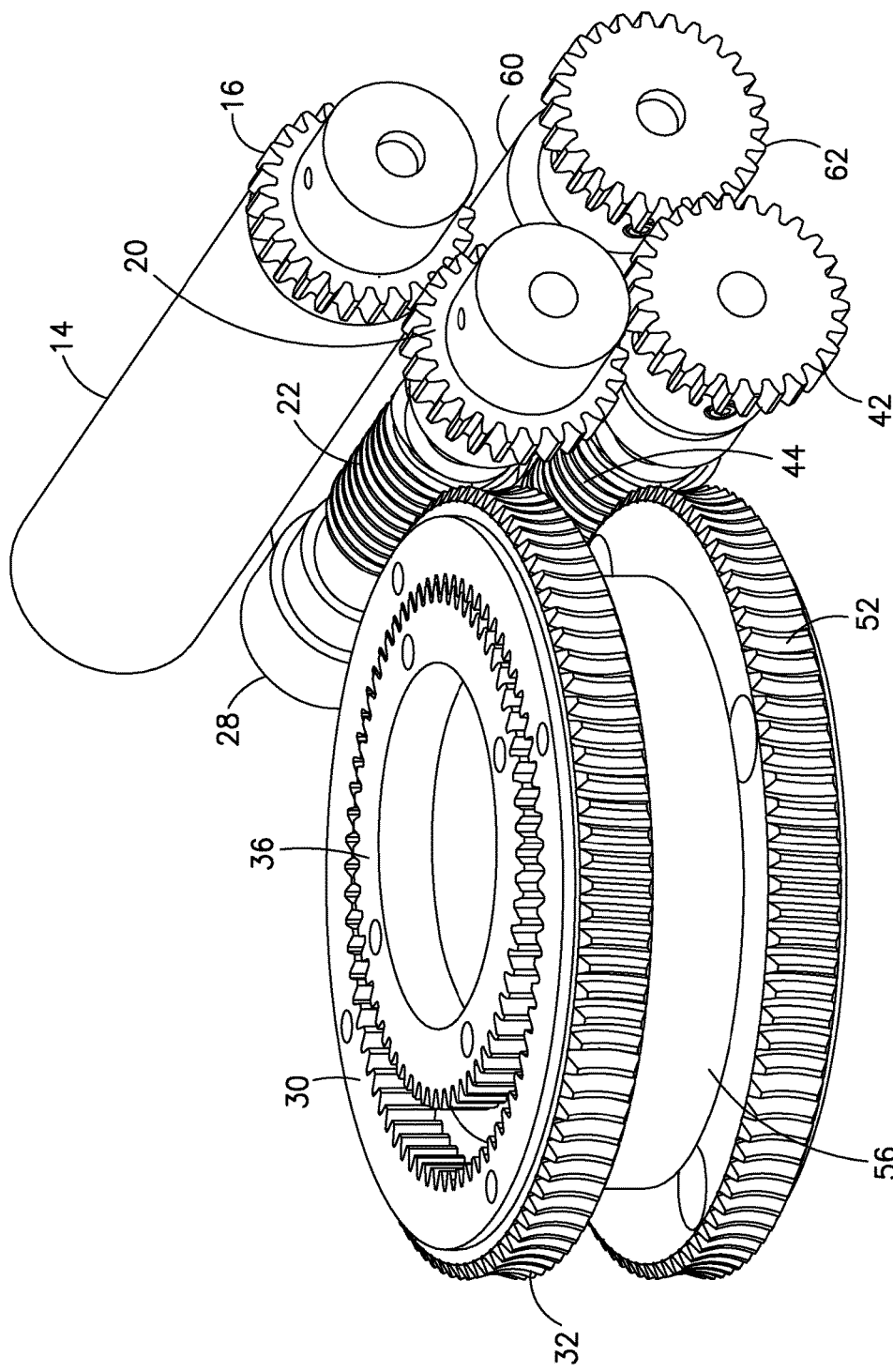
FIG. 4 is a schematic isometric view of the double eccentric positioning apparatus depicted in FIG. 1 with the housing and the inner eccentric bushing removed.

FIG. 4 shows the elements of the power transmission path to the outer eccentric bushing 56 (see power transmission path 6 in FIG. 6A), including a spur gear 62 mounted to the output shaft of the second micro servo motor 60 and a spur gear 42 mounted to a shaft (not visible in FIG. 4, but see shaft 45 in FIG. 5) that carries the worm gear 44. The spur gears 42 and 62 mesh to transmit power from the second micro servo motor 60 to the worm gear 44. As previously described, the worm gear 44 engages the worm wheel 52, to which the outer eccentric bushing 56 is affixed. The complete power transmission path 6 from the second micro servo motor 60 to the outer eccentric bushing 56 is shown in FIG. 6A.

FIG. 4 also shows the elements of the power transmission path to the inner eccentric bushing (see power transmission path 7 in FIG. 6B), including a spur gear 16 mounted to the output shaft of the first micro servo motor 14 and a spur gear 20 mounted to a shaft (not visible in FIG. 4, but see shaft 25 in FIG. 5) that carries the worm gear 22. The spur gears 16 and 20 are meshed to transmit power from the first micro servo motor 14 to the worm gear 22. As previously described, the worm gear 22 engages the worm wheel 32, which the internal spur gear 30 is affixed to. The internal spur gear 30 meshes with the external spur gear 36, which the inner eccentric bushing 34 is affixed to. The external spur gear 36 orbits inside the internal spur gear 30 during rotation. The complete power transmission path 7 from the first micro servo motor 14 to the inner eccentric bushing 34 is shown in FIG. 6B.

Each of the micro servo motors 14, 60 has an internal encoder for measuring the angular position of the motor output shaft. The micro servo motors 14, 60, when activated, will rotate their respective outputs shafts until the outputs of the internal encoders indicate that the encoder counts received from the control computer (see control computer 80 in FIG. 7) have been attained, meaning that the axis of the inner eccentric bushing 34 has arrived at the commanded location Additional internal components of the double eccentric positioning apparatus 10 (shown in FIG. 1) are visible in the exploded view of FIG. 5. The microswitches 18 and 64 are activated by protrusions (not shown) to indicate a home position. The rotatable assembly comprising spur gear 20 and worm gear 22 mounted to shaft 25 further comprises: a pair of bearings 24 and 26 disposed at opposing ends of worm gear 22; and a bearing preload screw 28 that is used to increase accuracy by reducing play in the bearings 24 and 26. Similarly, the rotatable assembly comprising spur gear 42 and worm gear 44 mounted to shaft 45 further comprises a pair of bearings 46 and 48 and a bearing preload screw 50.

Figure 7:
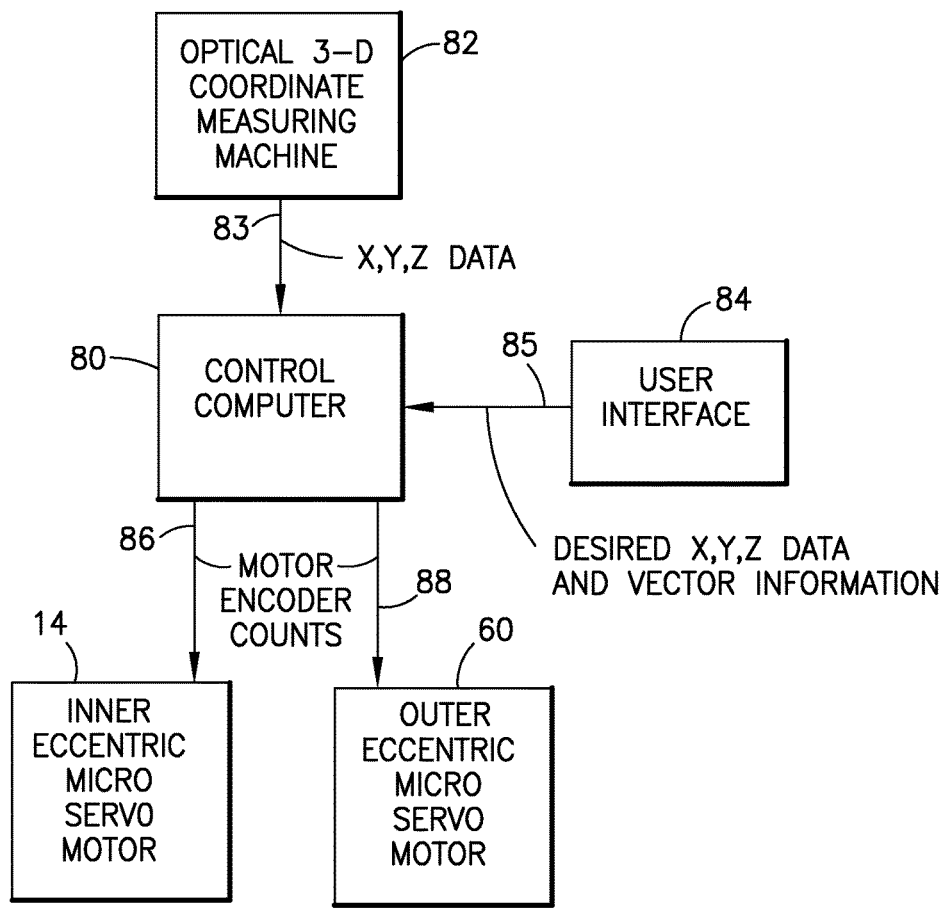
FIG. 7 is a block diagram showing the architecture of a system for controlling the offset vectors of a double eccentric positioning apparatus based on surface data collected by a metrology system.

FIG. 7 is a block diagram showing the architecture of a system for controlling the offset vectors of the double eccentric positioning apparatus 10 based on optical measurement of three-dimensional (3-D) coordinates by a portable metrology system (e.g., optical 3-D coordinate measuring machine 82). In accordance with one implementation, a photogrammetric tool (e.g., a TRITOP$^{CMM}$ system commercially available from Gesellschaft für Optische Messtechnik) is employed. A control computer 80 outputs respective encoder counts 86 and 88 to the micro servo motors 14 and 60 for moving the inner and outer eccentric bushings (see inner and outer eccentric bushings 34, 56 in FIG. 5) to respective desired positions in accordance with a position control algorithm. In accordance with one embodiment, the motor encoder counts are a function of measured x,y,z data 83 from an optical 3-D coordinate measuring machine 82 and desired x,y,z data and vector information 85 input by a system operator via a user interface 84.

The control computer 80 executes a position control algorithm that achieves fine positioning of the axis of the inner eccentric bushing 34 by operation of the micro servo motors 14 and 60. The goal is to move the axis of the inner eccentric bushing 34 relative to workpiece, so that the axis will intersect the workpiece at or near a nominal intersect point of an axis of the desired hole to be drilled with the nominal wing surface (to be described in detail later with reference to FIGS. 20A-20F). The control computer 80 will take in current x,y,z data 83, as provided by the optical 3-D coordinate measuring machine 82. Desired x,y,z data and vector information 85 can either be stored in the program, or can be fed to the control computer 80 via the user interface 84. Transformations will allow the control computer 80 to calculate x and y deviations based on each individual drill bushing (see drill bushing 94 in FIG. 20A). The x and y coordinates are converted to cylindrical coordinates (neglecting r and Z) to drive the micro servo motors 14 and 60. The rotation of the outer eccentric bushing 56 causes a rotation of the inner eccentric bushing 34 due to the planetary action between the internal spur gear 30 and the external spur gear 36, which drive the inner eccentric bushing 34. This movement is calculated and corrected by simultaneously moving the inner eccentric bearing 34 to compensate for the coupled movement between the inner and outer eccentric bearings 34, 56.

Figure 8:
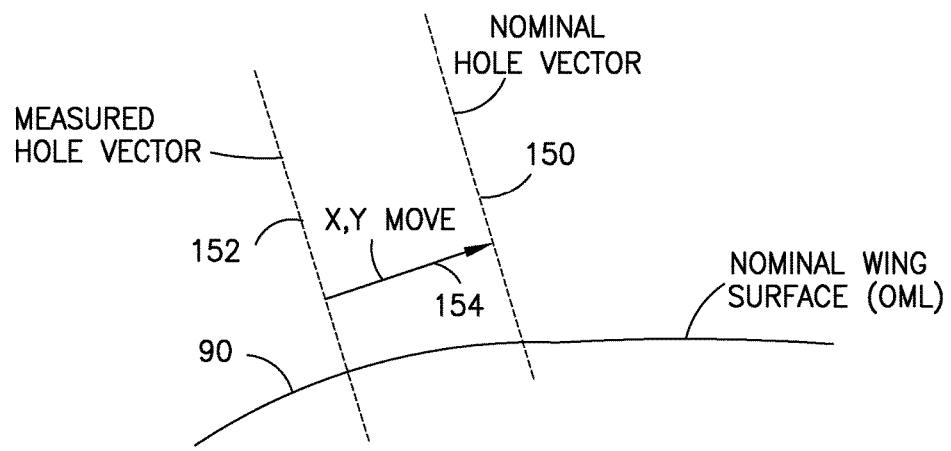
FIG. 8 is a diagram showing the relationship in space of measured and desired intersection vectors used to calculate a move by the double eccentric positioning apparatus to a new position when the intersection vectors are parallel.
Figure 24:
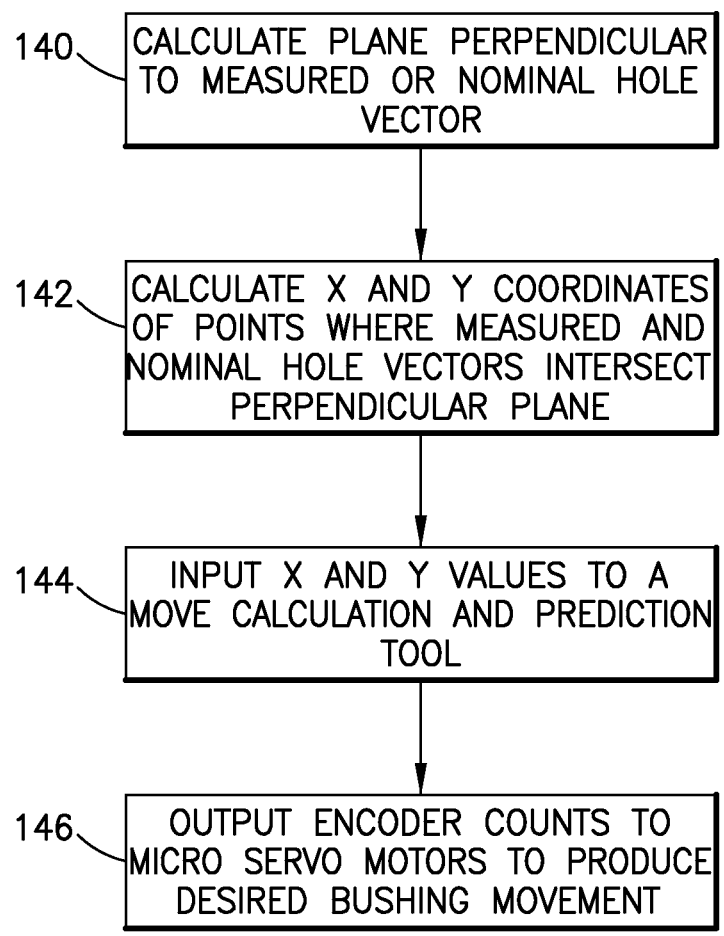
FIG. 24 is a flowchart showing a process for generating motor encoder counts that will produce a desired movement by an adjustable bushing.

FIG. 8 is a diagram showing parallel measured and desired (i.e., nominal) hole vectors 152 and 150 intersecting a nominal wing surface 90 (OML) having 3-D coordinates defined by a stored CAD model. In accordance with one method, these parallel vectors can be used to calculate a move 154 by the double eccentric positioning apparatus 10 that places the axis of the inner eccentric bushing 34 in the correct position, i.e., within a specified tolerance of the intersect point of the nominal hole vector 150 with the nominal wing surface 90. This process is shown in FIG. 24. First, a plane perpendicular to the known measured or nominal hole vector is calculated (step 140). Then the x and y coordinates of the points where the known measured and nominal hole vectors intersect the perpendicular plane are calculated (step 142). The x and y values for the desired move-to location are then input to a move calculator and prediction tool (step 144) running on control computer 80 (seen in FIG. 7), which will output correct encoder counts (steps 146) for each micro servo motor 14, 60 (see FIG. 5) of the double eccentric positioning apparatus 10 (see FIG. 1). These encoder counts produce the desired movement of the axis of the inner eccentric bushing 34 from a location coaxial with the measured hole vector 152 to a location coaxial with the nominal hole vector 150. This method could lead to a small error if the vectors are not parallel.

Figure 9:
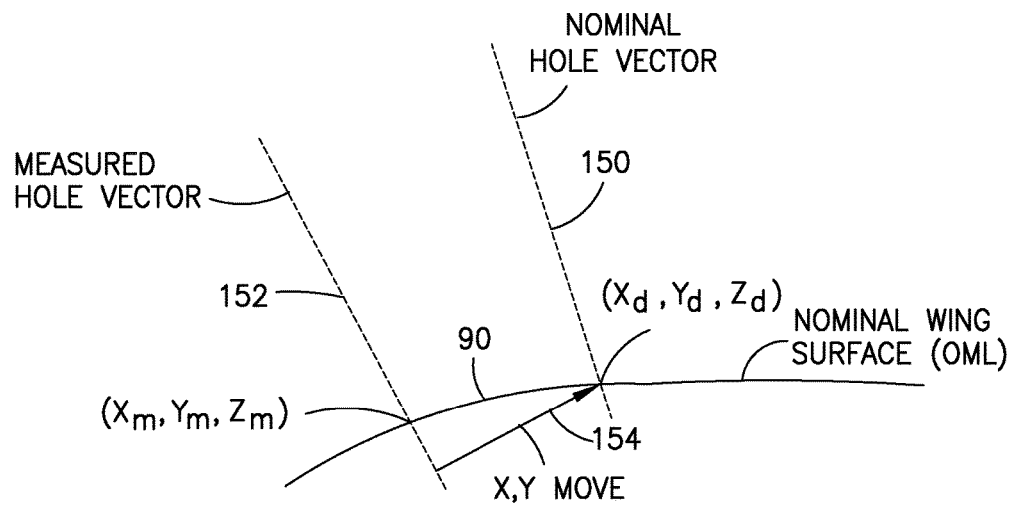
FIG. 9 is a diagram showing the relationship in space of measured and desired intersection vectors used to calculate a move by the double eccentric positioning apparatus to a new position when the intersection vectors are not parallel.

FIG. 9 is a diagram showing non-parallel measured and nominal hole vectors 152 and 150 intersecting a nominal wing surface 90 (OML) having 3-D coordinates defined by a stored CAD model. In accordance with a second method, non-parallel measured and nominal hole vectors 152 and 150 can be used to calculate a move by the double eccentric positioning apparatus 10 that places the axis of the inner eccentric bushing 34 in the correct position. A best fit for the intersection with the skin (or plate) can be determined as long as the direction of the measured hole vector 152 is known. FIG. 9 shows a case where the axis of the inner eccentric bushing 34 is moved in a plane perpendicular to the measured hole vector 152. In the alternative, the axis of the inner eccentric bushing 34 is moved in a plane perpendicular to the nominal hole vector 150. These methods will work for all cases (including when the measured and nominal hole vectors 152, 150 are parallel).

In accordance with the method depicted in FIG. 9, the measured hole vector 152, represented by the function $ai+bj+ck$, is converted to a parametric ray:

$$(x_m, y_m, z_m) + t(a,b,c)$$

where $(x_m, y_m, z_m)$ are the 3-D coordinates of the point where the measured hole vector 152 intersects the nominal wing surface (OML). The resulting components (i.e., vector equations) are:

$$x = x_m + t*a$$

$$y = y_m + t*b$$

$$z = z_m + t*c$$

Then a plane is found which is normal to the measured hole vector 152 and intersects the point at which the nominal hole vector 150 intersects the nominal wing surface 90:

$$a*[x-x_n] + b*[y-y_n] + c*[z-z_n]$$

where $(x_n, y_n, z_n)$ is the point at which the nominal hole vector 150 intersects the nominal wing surface 90. The vector equations are then substituted into the plane equation. Next the computer solves for the parameter t. The parameter t is then substituted back into the vector equations to get the intersect point of the measured hole vector 152 and the plane. The intersect point of the measured hole vector 152 with the plane and point $(x_n, y_n, z_n)$ are then used to compute the distance and direction of the move of the axis of the inner eccentric bushing 34.

Figure 10:
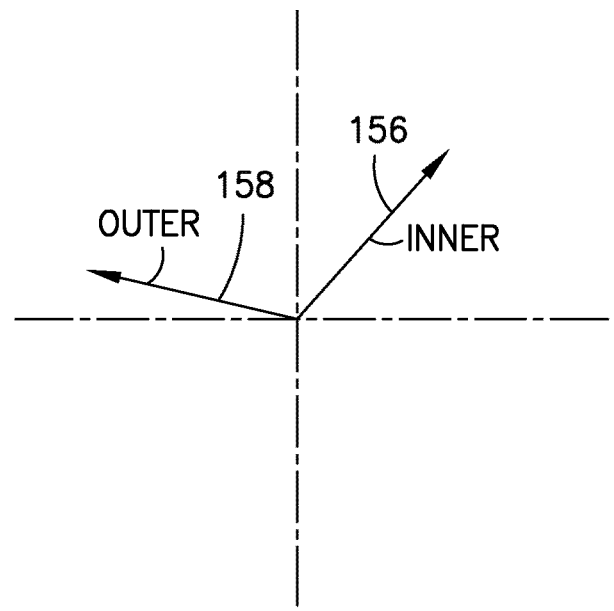
FIG. 10 is a diagram showing two vectors having lengths proportional to the respective offsets of the inner and outer eccentric bushings, the offsets being equal.
Figure 11:
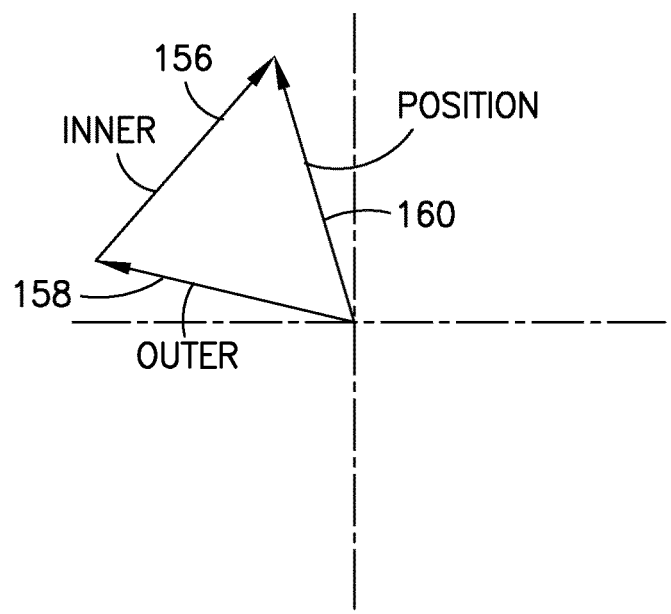
Figure 12:
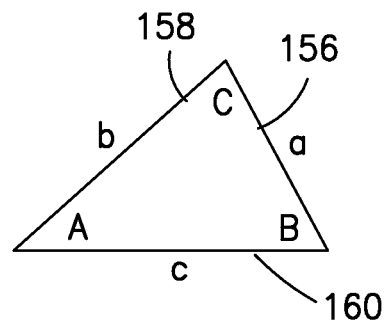
FIG. 12 is a diagram showing the relationship of the sides and angles of a triangle formed by the vectors depicted in FIG. 11.

FIG. 10 is a diagram showing two vectors 156 and 158 having lengths proportional to the respective offsets of the inner and outer eccentric bushings 34, 56, the offsets being equal. Global coordinates need to be transformed into desired x and y moves. The intersect point of the measured hole vector 152 with the plane and point $(x_n, y_n, z_n)$ is converted to the positioner's coordinate system (also referred to later as "bushing coordinates"), and the measured position is normalized to zero. The difference will be the distance the positioner moves. FIG. 11 is a diagram showing vector addition of the inner and outer offset vectors 156 and 158 shown in FIG. 10, the resulting vector 160 extending from the origin to the point to where the axis of the inner eccentric bushing 34 will be moved to. FIG. 12 is a diagram showing the relationship of the sides and angles of a triangle formed by the vectors 156, 158 and 160 depicted in FIG. 11.

Figure 13:
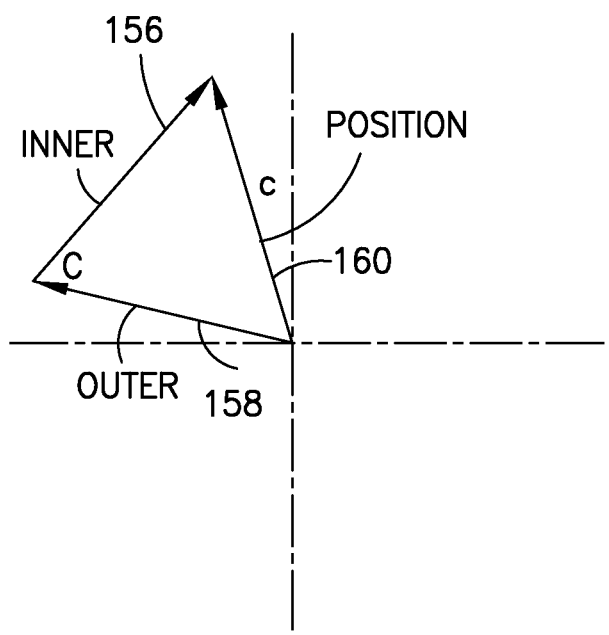
FIG. 13 is a diagram showing vector addition of the inner and outer offset vectors (as shown in FIG. 11), but with the addition of angle C and length c from FIG. 12 to indicate the angle between the inner and outer offset vectors and distance that the axis of the inner eccentric bushing will be moved, respectively.

FIG. 13 is a diagram showing vector addition of the inner and outer offset vectors 156 and 158 (as shown in FIG. 11), but with the addition of angle C and length c from FIG. 12 to indicate the angle between the inner and outer offset vectors 156 and 158 and distance that the axis of the inner eccentric bushing 34 will be moved, respectively. Two vectors (one for each eccentric) will be placed at the origin. Vector addition will place the inner vector 156 on the end of the outer vector 158. The length of these vectors is the offset of each eccentric bushing (e.g., 0.104 in one implementation). The resulting vector 160 (position) will run from the origin to the point to where the positioner will move to. The length of the position vector 160 is easily found using the distance formula between the origin and the end of the inner vector 156. The inner and outer vectors 156 and 158 in FIG. 13 are the same length, so using the law of sines, the computer (see control computer 80 in FIG. 7) knows their respective angles with respect to the position vector 160 are the same. Using the law of cosines, the control computer 80 can calculate the angle between the inner and outer vectors 156, 158, and subsequently solve for the rotation angles of the outer and inner vectors 158, 156. Every point within the reach of the positioner (besides the origin and the radial periphery) has two solutions, mirrored about the position vector 160. The relative angles between the position, outer, and inner vectors 160, 158, 156 are the same, but one needs to specify which orientation is preferred. Preferably, the angle between the outer vector 158 and the position vector 160 would always be added to the angle of the position vector 160. Using this assumption, one can calculate the angles of the inner and outer vectors 156, 158. The angle of the position vector 160 is calculated using trigonometry, paying careful attention to the quadrant in which the position vector 160 lies. The angle of the outer vector 158 with respect to the global coordinate system is the angle of the position vector 160 plus the angle between the outer vector 158 and the position vector 160. The angle of the inner vector 156 with respect to the global coordinate system is the angle of the outer vector 158 plus the angle C minus 180 degrees. In the special case in which the point is at the periphery, the angles of the outer and inner vectors 158, 156 with respect to the position vector 160 are both zero (C=180 degrees). The rotation angle of the outer eccentric bushing 56 is identical to the rotation angle of the outer vector 158. The rotation of the outer eccentric bushing 56 causes the inner eccentric bushing 34 to rotate in a reverse direction, therefore, one needs to add this reverse rotation angle into the inner vector angle to achieve the angle of rotation required for the inner eccentric bushing 34. This reverse rotation angle is equal to the difference in tooth counts of the internal spur gear 30 and the external spur gear 36 (see FIG. 6B), divided by the tooth count of the internal spur gear 30, multiplied by the angle of rotation of the outer eccentric bushing 56. Limitations must be placed on the eccentric bushing rotation angles such that they are between 0 and 360 degrees, so as to not rotate more than a single revolution.

Figure 14:
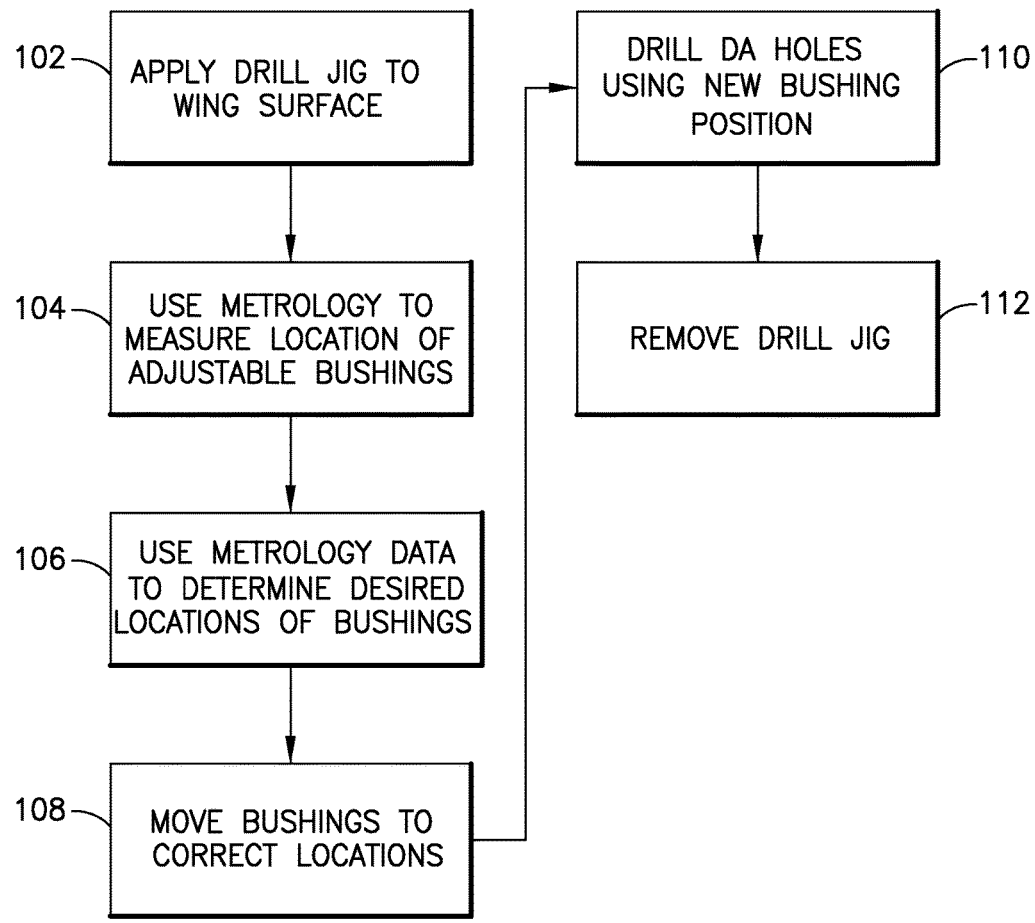
FIG. 14 is a flowchart showing steps of a metrology-directed, determinate assembly hole placement method.

FIG. 14 is a flowchart shows steps of a metrology-directed, determinate assembly hole placement method in accordance with one embodiment. A drill jig is applied to a wing surface (step 102), e.g., by clamping to the wingbox. Then a metrology system is used to measure the location of the axis of the inner eccentric bushing of each double eccentric positioning apparatus attached to the drill jig (step 104). The metrology data is used to determine the desired location for the axis of the inner eccentric bushing of each double eccentric positioning apparatus (step 106). The inner and outer eccentric bushings are then moved to achieve the correct location for each drill bushing, which is coaxial with the inner eccentric bushing in which it is inserted (step 108). The DA holes are then drilled while the drill bushings are in their new positions (step 110). Upon completion of the drilling operations, the drill jig is removed from the wing box (step 112).

Figure 15:
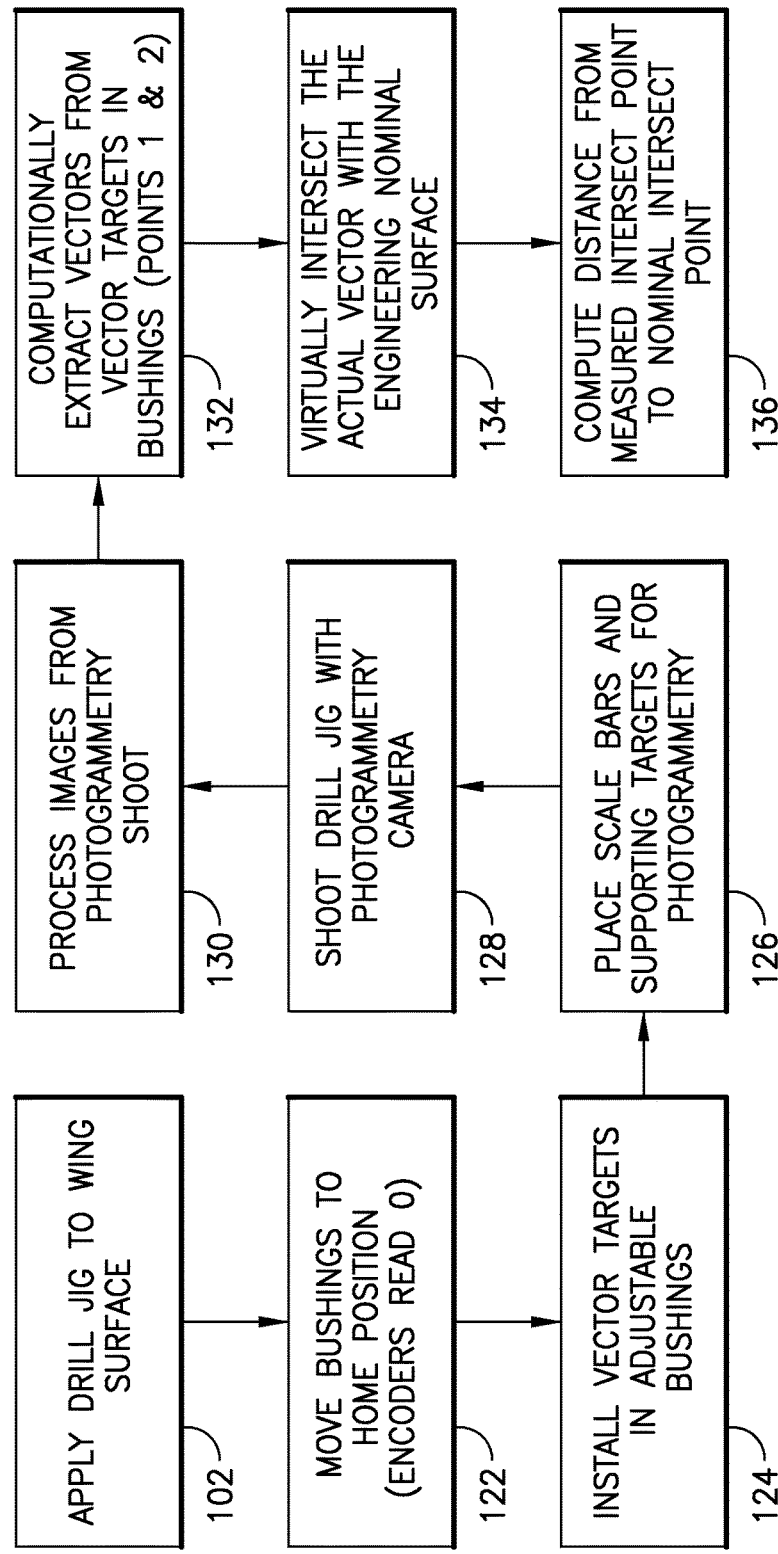
FIG. 15 is a flowchart showing steps of a method for determining the desired position of a center of the opening in the inner eccentric bushing of a double eccentric positioning apparatus in accordance with one embodiment.

FIG. 15 is a flowchart showing steps of a method for determining the desired position of a center axis (also referred to herein as the nominal hole vector) of the opening in the inner eccentric bushing of a double eccentric positioning apparatus in accordance with one embodiment. As previously mentioned, a drill jig is applied to a wing surface (step 102), e.g., by clamping to the wingbox. A multiplicity of double eccentric positioning apparatuses 10 are attached to the drill jig (seen in FIG. 17, discussed below). The state of each double eccentric positioning apparatus 10 is controlled by the control computer 80 shown in FIG. 7. Still referring to FIG. 15, the inner and outer eccentric bushings 34, 56 of each double eccentric positioning apparatus 10 are moved to their respective home positions, whereat the encoders read 0 (step 122). A respective vector target (see vector target 114 in FIGS. 16A and 16B) is inserted in the opening of the inner eccentric bushing of each double eccentric positioning apparatus (step 124). Then scale bars and supporting optical targets (see scale bars 120 and optical targets 124 in FIG. 17) for photogrammetry are placed on the wing surface (step 126). Then the metrology system operator captures the location of the optical targets 124 using, for example, a photogrammetry camera (step 128). The images from the photogrammetry shoot are processed in a well-known manner (step 130). Vectors (i.e., measured hole vectors characterized by the locations of two points) are computationally extracted from photogrammetric data acquired from the vector targets (see vector targets 114 in FIG. 16B) in the bushings (step 132). In accordance with one embodiment, further computations are performed for each drill bushing which virtually intersect the measured hole vector with a nominal wing surface or with a plane that is perpendicular to a nominal hole vector and intersects the nominal intersect point (i.e., the intersect point of the nominal hole vector with the nominal wing surface) (step 134). Then a distance from the intersect point of the measured hole vector with the nominal wing surface (or the aforementioned plane) to the nominal intersect point is computed (step 136). These distances are then converted to move-to locations in bushing coordinates. A function receives the x and y coordinates of the move-to locations and uses that information to determine the encoder counts for moving the respective drill bushings to their respective move-to locations.

FIGS. 16A and 16B are schematic isometric views showing a vector target 114 above (FIG. 16A) and installed inside (FIG. 16B) the double eccentric positioning apparatus depicted in FIG. 1. More specifically, as best seen in FIG. 16A, the stem of the vector target 114 will be inserted inside an opening of a drill bushing 94, which is in turn inserted inside the opening of the inner eccentric bushing 34. (The axes of the openings in drill bushing 94 and inner eccentric bushing 34 are coaxial.) The dashed line through the vector target 114 in FIG. 16B represents the measured hole vector 152, which intersects a pair of optical targets 116 and 118 incorporated in the vector target 114. As previously described, a photogrammetric camera is used to acquire images of vector targets inserted in all of the double eccentric positioning apparatuses attached to the drill jig. An optical 3-D coordinate measuring machine (see optical 3-D coordinate measuring machine 82 in FIG. 7) determines the 3-D coordinates of respective points (hereinafter "Point 2" and "Point 1") corresponding to the locations of the optical targets 116 and 118 from the acquired image data. The line in virtual space which connects Points 1 and 2 corresponds to the measured hole vector 152 (see FIG. 21A).

Figure 18:
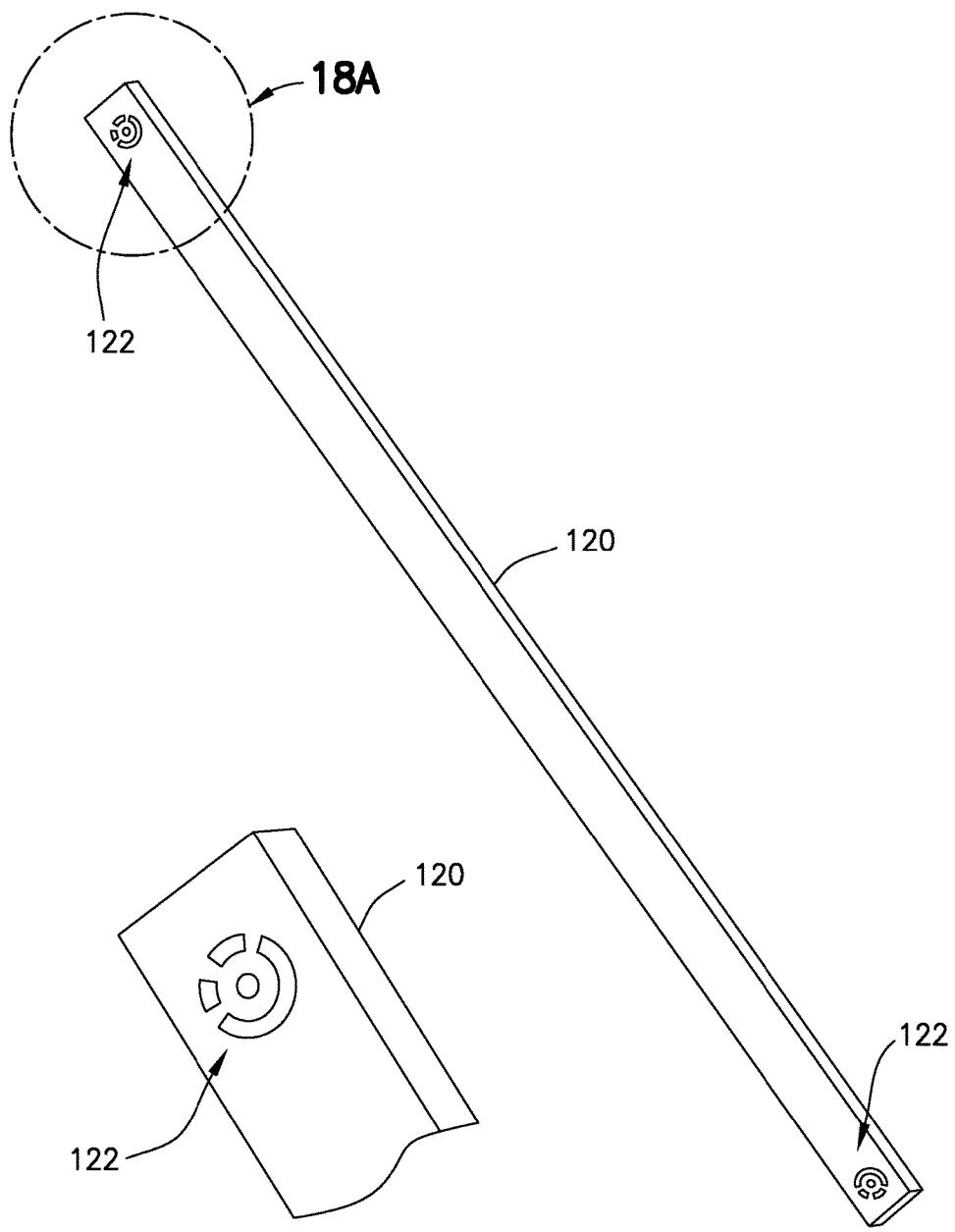
FIG. 18 is a schematic isometric view of a scale bar marked with coded target (shown with a magnified scale in FIG. 18A) in accordance with the embodiment depicted in FIG. 17.

FIG. 17 is a schematic isometric view of a multiplicity of double eccentric positioning apparatuses 10 installed on a lightweight drill jig 70 for rough placement on a wingbox 126 in accordance with one embodiment. The drill jig 70 is attached to the wingbox by means of a clamp 130 (which clamps to a fitting) and suction cups (not shown). The adjustable bushing drill jigs installed on drill jig 70 support respective double eccentric positioning apparatuses 10, one for each DA hole to be drilled. The motors of the double eccentric positioning apparatuses 10 receive the motor encoder counts from the control computer (see control computer 80 in FIG. 7) via an electrical cable 128. After (or before) the vector targets have been installed in the double eccentric positioning apparatuses 10, the scale bars 120 are placed next to and across the drill jig 70 to set the photogrammetry scale. FIG. 18 is a schematic isometric view of a scale bar 120 marked with coded optical targets 122 (shown with a magnified scale in FIG. 18A) in accordance with one embodiment. In addition, adhesive photogrammetry scan targets 124 are placed on a skin surface of the wingbox 126 around the drill jig 70 for image bundling. Step 122 and subsequent steps listed in the flowchart shown in FIG. 15 are performed while the drill jig 70 is clamped on the wingbox 126 in the manner shown in FIG. 17.

Figure 19:
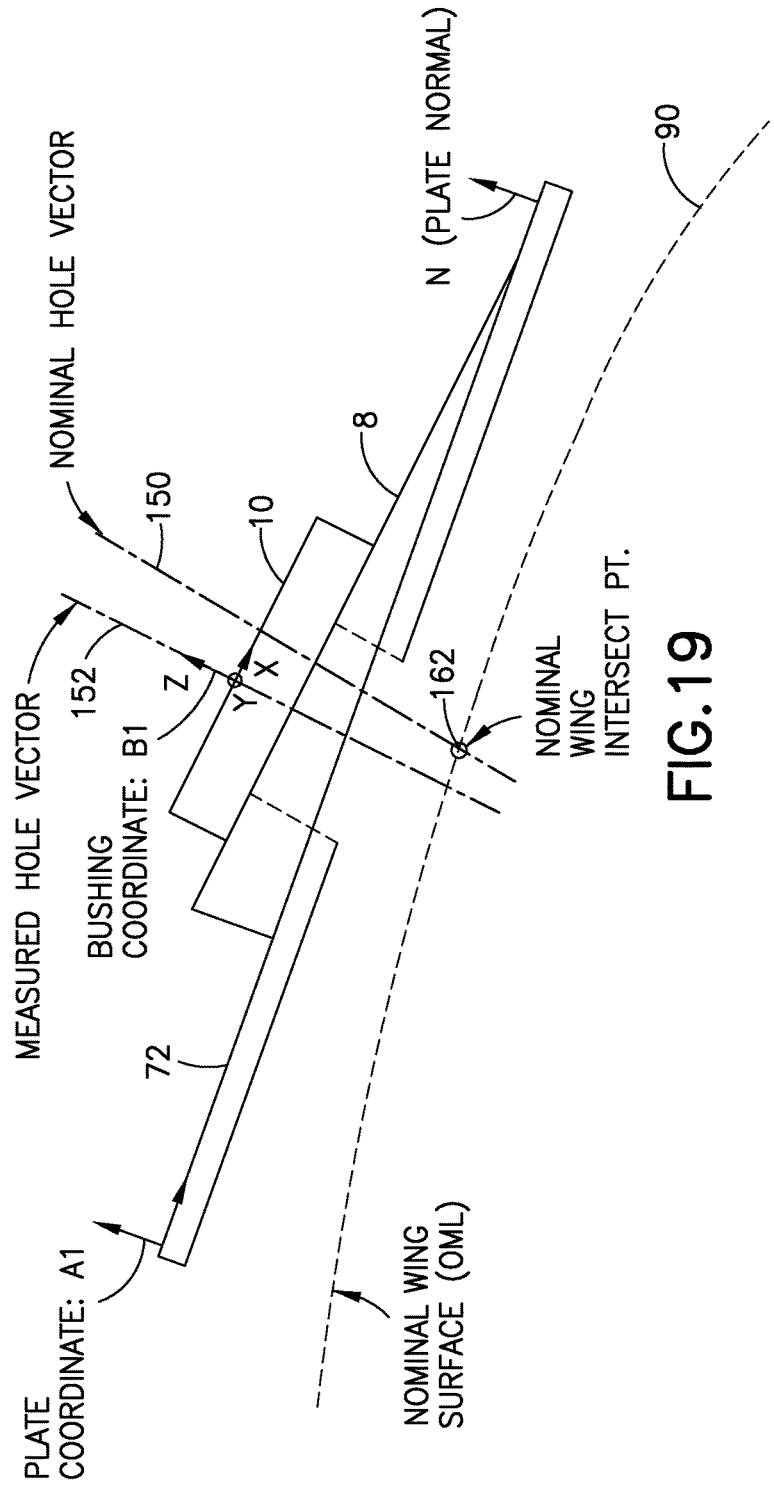
FIG. 19 is a diagram representing a side view of an adjustable bushing drill jig installed on a base plate. The nominal wing surface (OML) is depicted as a dashed line 90.

FIG. 19 is a diagram representing a side view of a double eccentric positioning apparatuses 10 installed on a base plate 72 of a drill jig in accordance with an alternative embodiment. A nominal wing surface 90 (OML) is depicted as a dashed line. The double eccentric positioning apparatus 10 is seated on a wedge 8. The wedge 8 serves to adjust the orientation of the axis of the opening in the inner eccentric bushing 34, moving it from the location indicated by the measured hole vector 152 in FIG. 19 to or near a location indicated by the nominal hole vector 150 in FIG. 19). The nominal hole vector 150 intersects the nominal wing surface 90 at a nominal wing intersect point 162. The base plate 72 is positioned to provide a rough placement of the axis of the opening in the inner eccentric bushing 34 near the nominal hole vector 150.

FIGS. 20A-F are graphical representations of calculations performed to find a new drill bushing location in accordance with one embodiment. In each graphical representation, the more smooth contour represents a nominal wing surface 90, while the less smooth contour represents an actual wing surface 92. The drill bushing 94 is depicted in FIGS. 20A-E on a reduced scale to avoid clutter in the drawings, as is the vector target 114 in FIG. 20A. These calculations can be applied when employing different positioner setups, including the respective setups depicted in FIGS. 1 and 19.

In accordance with the embodiment shown in FIGS. 20A-F, the distance and direction that the centerline axis of the drill bushing 94 (which is coaxial with the centerline axis of the inner eccentric bushing) is to be moved is determined based on the location of the nominal wing intersect point 162 (indicated by a large open circle in FIGS. 20A-F) and the location of the point (hereinafter "actual vector/plane intersect point 166") where the measured hole vector 152 intersects a plane 164 that is normal to the nominal hole vector 150 and intersects the nominal wing intersect point 162. The procedure will now be described in detail.

Figure 20A:
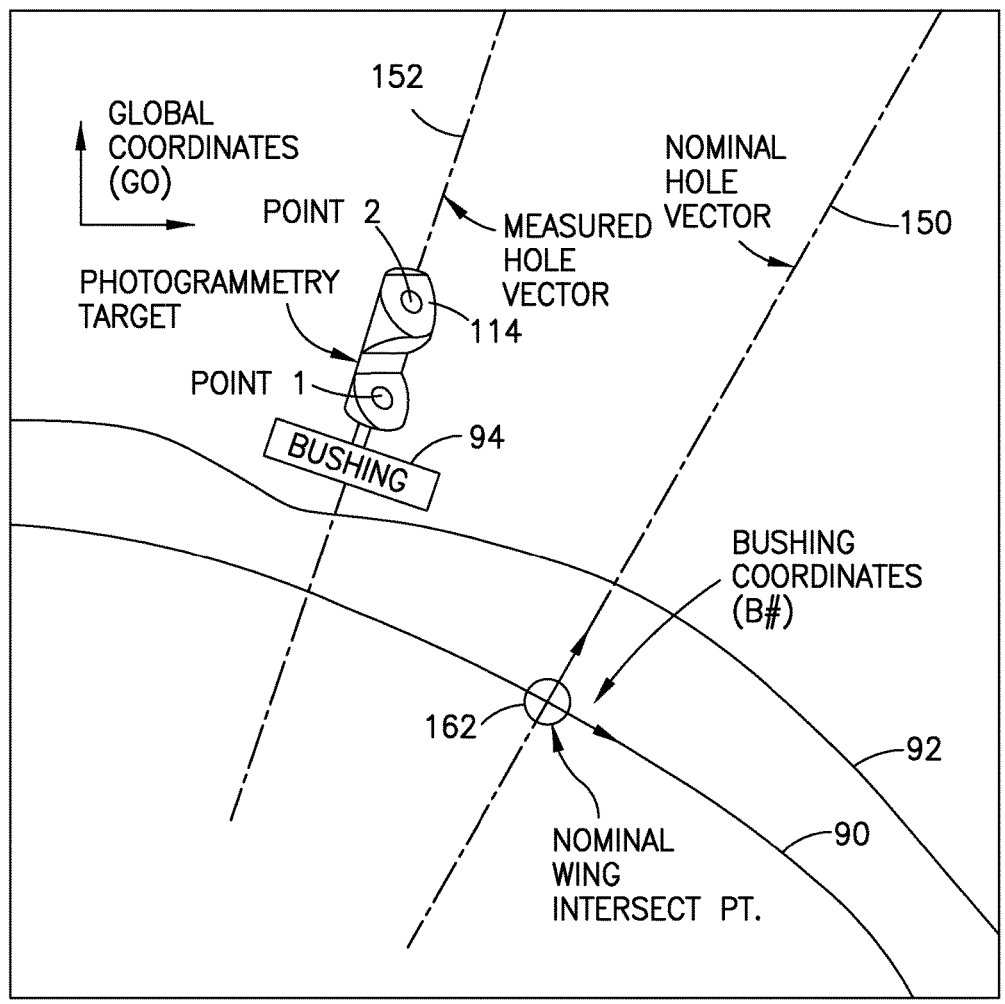
FIGS. 20A through 20F are graphical representations of calculations performed to find a new drill bushing location in accordance with one embodiment. In each graphical representation, the more smooth contour represents a nominal wing surface 90, while the less smooth contour represents an actual wing surface 92.

FIG. 20A depicts a scenario wherein the location of the centerline axis of the opening in the drill bushing 94 is acquired in global (i.e., airplane) coordinates (GO) using a photogrammetry camera (not shown) and a vector target 114. The locations of Points 1 and 2 on the vector target 114 are measured in the global coordinate system. The measured locations of Points 1 and 2, which define the position and orientation of the measured hole vector 152, are transformed into X,Y,Z bushing coordinates, but only the X and Y coordinates are used to determine how much the drill bushing 94 should be moved.

FIG. 20A also shows a nominal wing intersect point 162 (indicated by a large open circle) where a nominal hole vector 150 intersects the nominal wing surface 90 in accordance with an engineering CAD model of a wingbox surface with a pattern of desired drillhole locations. The position of the nominal wing intersect point 162 is given in bushing coordinates (B#). For convenience, the origin of the bushing coordinate system is located at the nominal wing intersect point 162.

Figure 20B:
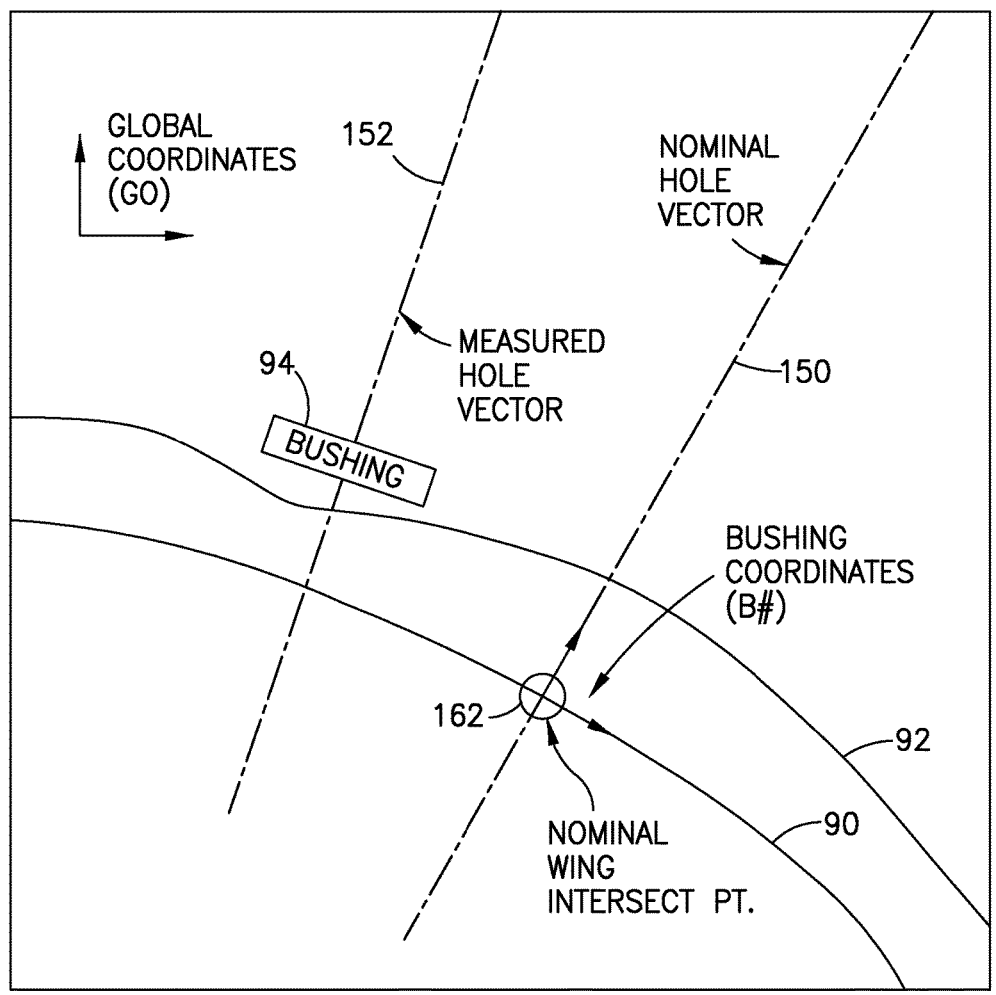

As seen in FIG. 20B, the vector target can be removed after the locations of Points 1 and 2 have been measured. In the next computation, the locations of Points 1 and 2 are transformed from global coordinates into bushing coordinates for comparison with the location of the nominal hole vector 150.

Figure 20C:
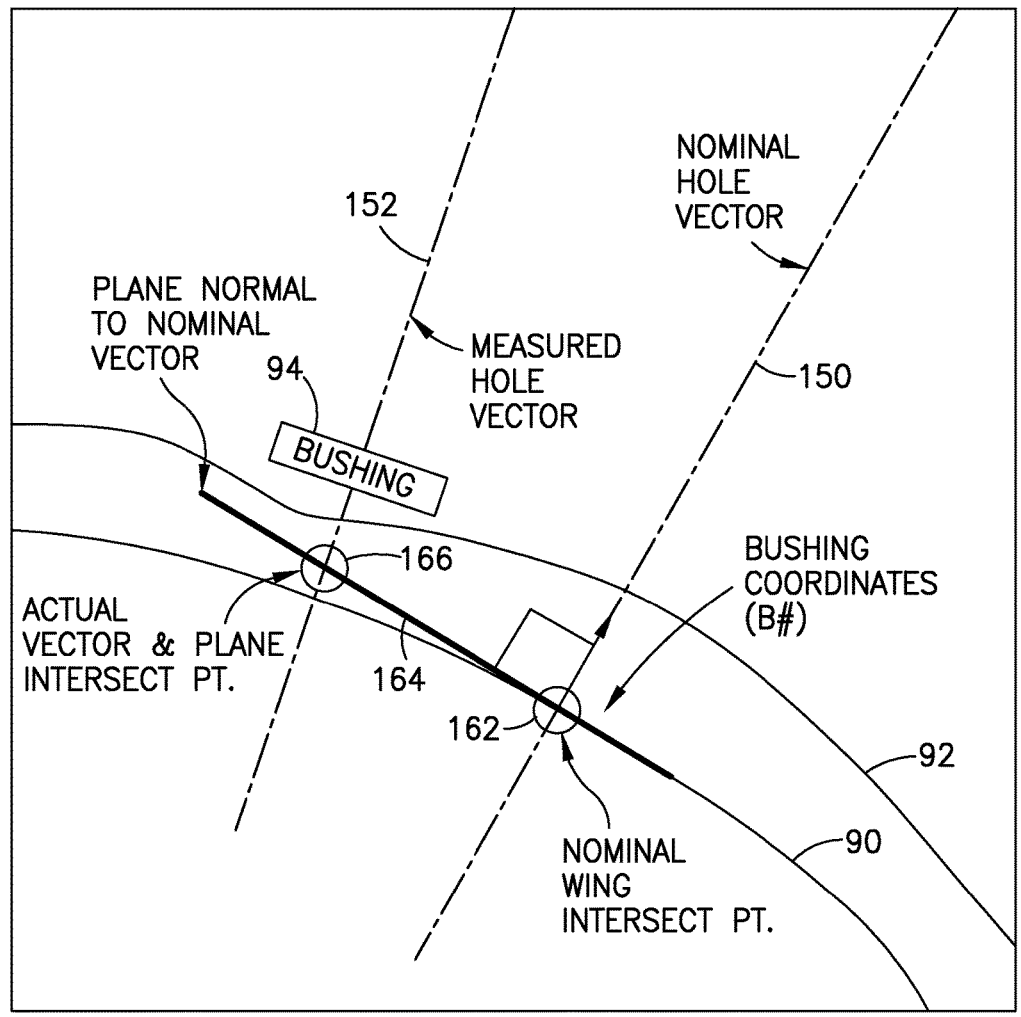

The next step in the computational process is shown in FIG. 20C. Once Points 1 and 2, which define the measured hole vector 152, are in bushing coordinates, the data is processed to determine the distance the drill bushing 94 must be moved. This computation determines the X,Y,Z location in bushing coordinates of the intersection of the measured hole vector 152 and a plane 164 normal to the nominal hole vector 150 which intersects the nominal wing intercept point 162. This plane 164 is indicated by a bold solid straight line (intersecting the nominal hole vector 150 at right angles) in each of FIGS. 2C-F. The X and Y coordinates of the actual vector/plane intersect point 166 are indicated by a large open circle in FIG. 20C.

Figure 20D:
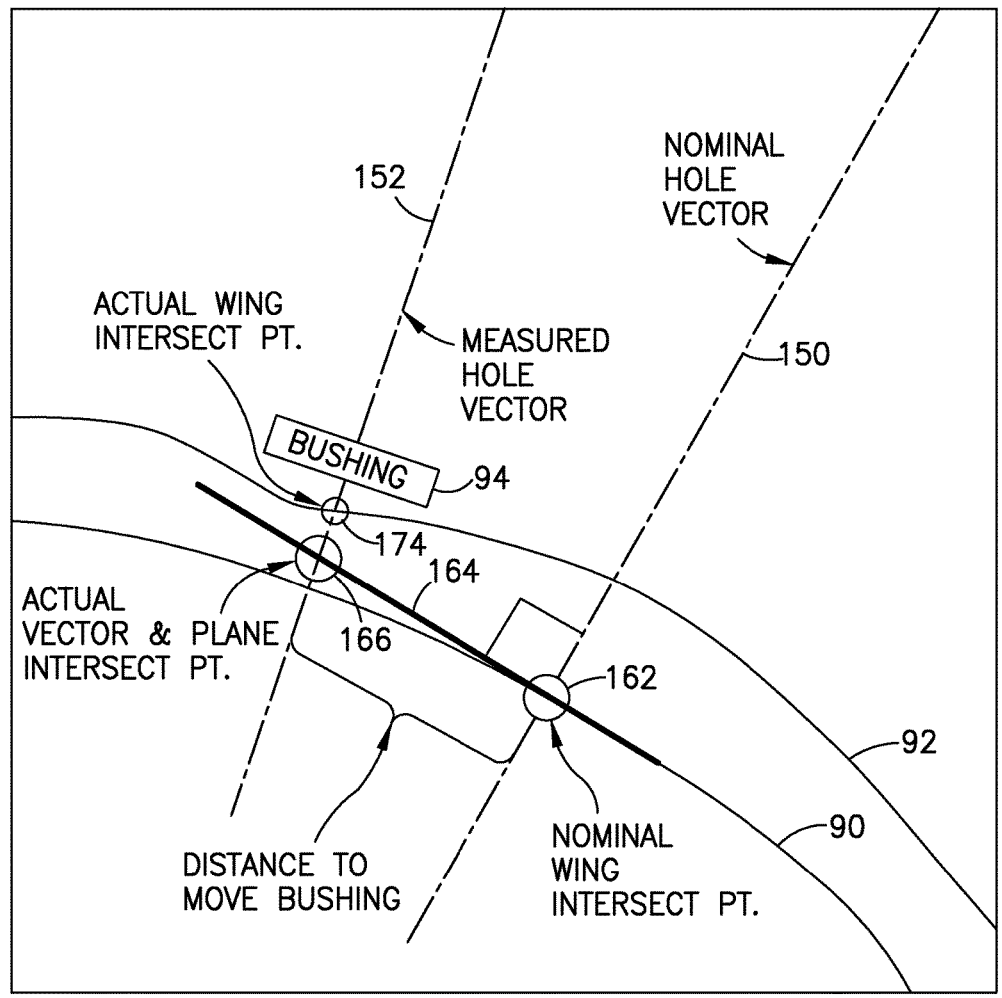

The next step in the computational process is shown in FIG. 20D. The X and Y components of the distance between the actual vector/plane intersect point 166 and the nominal wing intersect point 162 are calculated. The respective distances x and y separating the nominal wing intersect point 162 and the actual vector/plane intersect point 166 represent the components of the distance to move the bushing to the desired drill point, i.e., the distance between the large open circles in FIG. 20D. FIG. 20D also includes an actual wing intersect point 174 (represented by a small open circle) that is the intersection of the actual wing surface 92 and the measured hole vector 152.

Figure 20E:
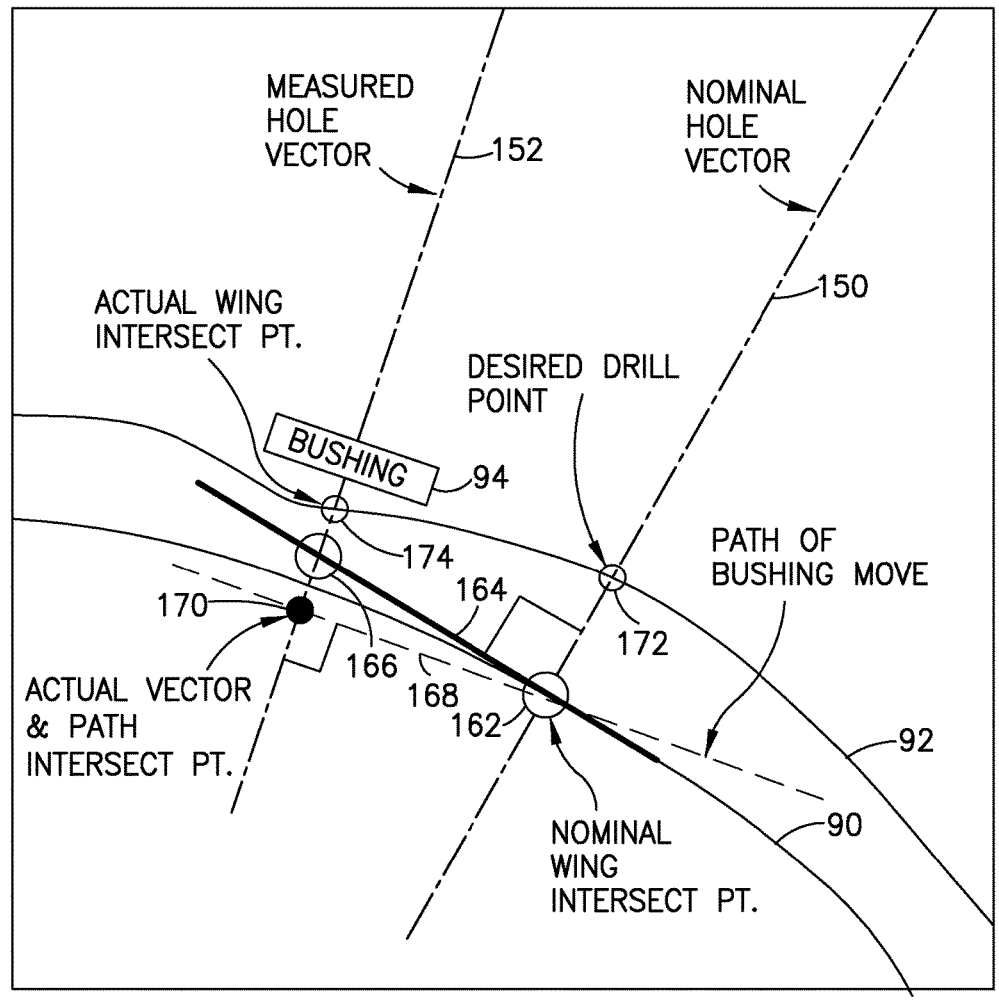

The computed motion path of drill bushing 94 will be along a plane that is normal to the nominal hole vector 150 instead of normal to the measured hole vector 152. This motion path 168 is indicated in FIG. 20E by a dashed straight line which intersects the measured hole vector 152 at an actual vector and path intersect point 170 (indicated by a small closed circle in FIG. 20E). Again the actual wing intersect point 174 is represented by a small open circle in FIG. 20E. The desired drill point 172, i.e., the intersection of the actual wing surface 92 and the nominal hole vector 150, is indicated by a second small open circle in FIG. 20E.

Figure 20F:
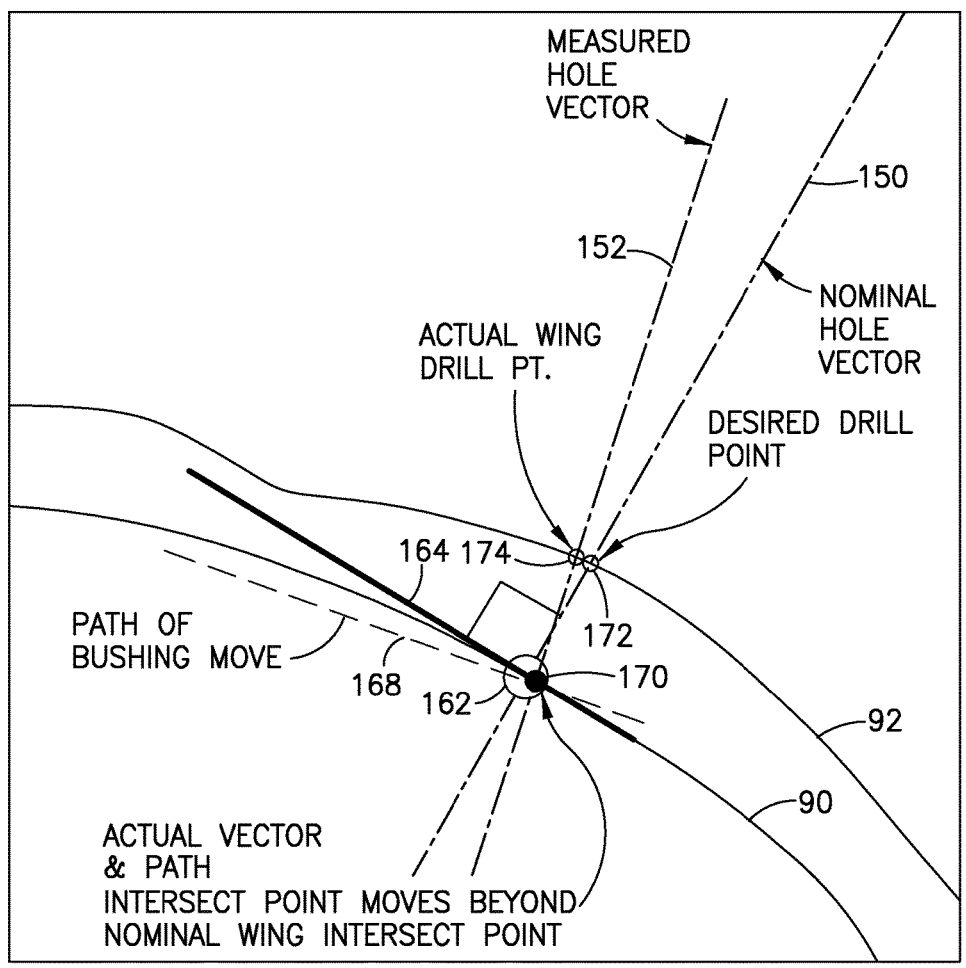

The result of the computations will be instructions to move the drill bushing 94 from the actual wing intersect point 174 to or near the desired drill point 172. A function converts the input x and y values for the desired move into encoder counts which will be sent to the previously described micro servo motors. Those motors will then cause the inner and outer eccentric bushings to rotate by respective angles that will result in the axis of the drill bushing 94 being moved from the actual wing intersect point 174 to the desired drill point 172 (or very close thereto). FIG. 20F shows the situation after the drill bushing 94 has been moved by the computed distance. Since the distance was calculated with respect to the plane 164 normal to the nominal hole vector 150, but the computed path of the drill bushing is in the plane 168 normal to the measured hole vector 152, the actual vector/path intersect point 170 (indicated by the small closed circle in FIG. 20F) may move beyond the nominal wing intersect point 162 (indicated by the large open circle in FIG. 20F). As a result, the actual wing drill point 174 will be close to the desired drill point 172, as seen in FIG. 20F.

Figure 21A:
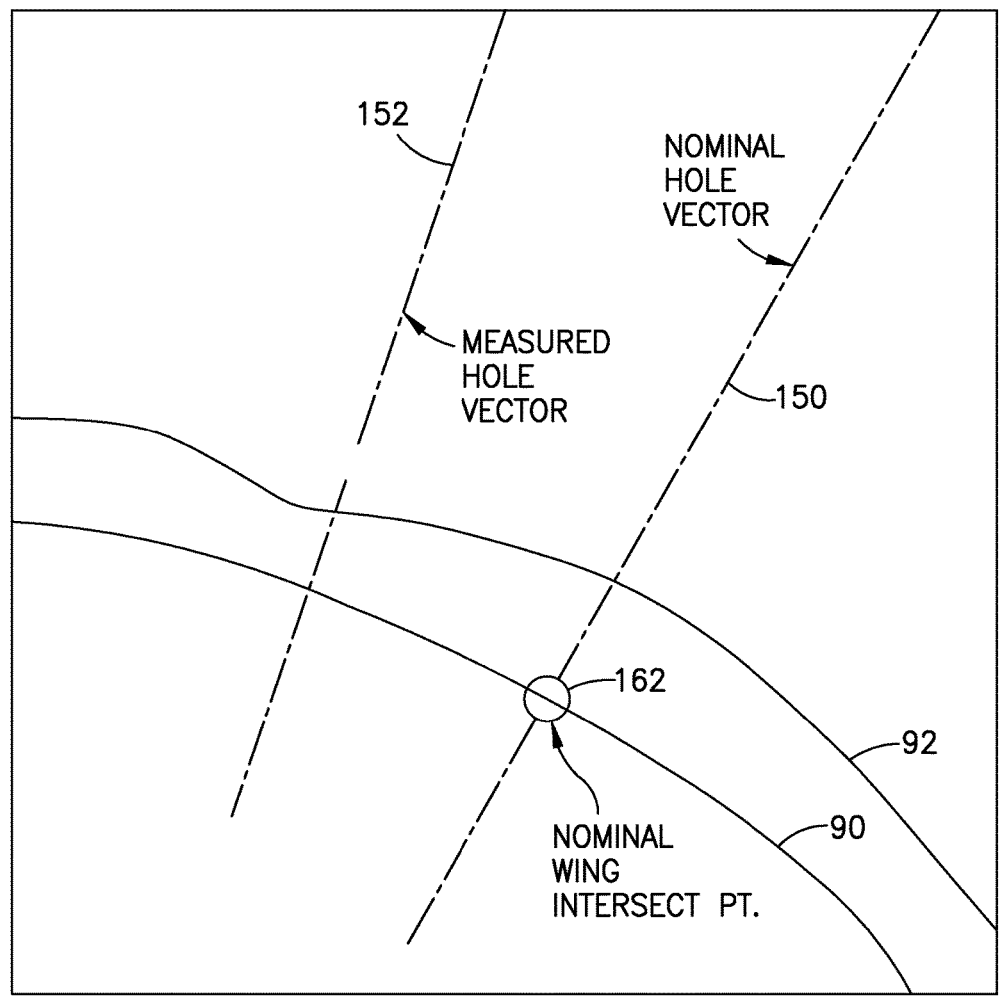
FIGS. 21A through 21E are graphical representations of calculations performed to find a new drill bushing location in accordance with another embodiment. In each graphical representation, the more smooth contour represents a nominal wing surface 90, while the less smooth contour represents an actual wing surface 92.
Figure 21B:
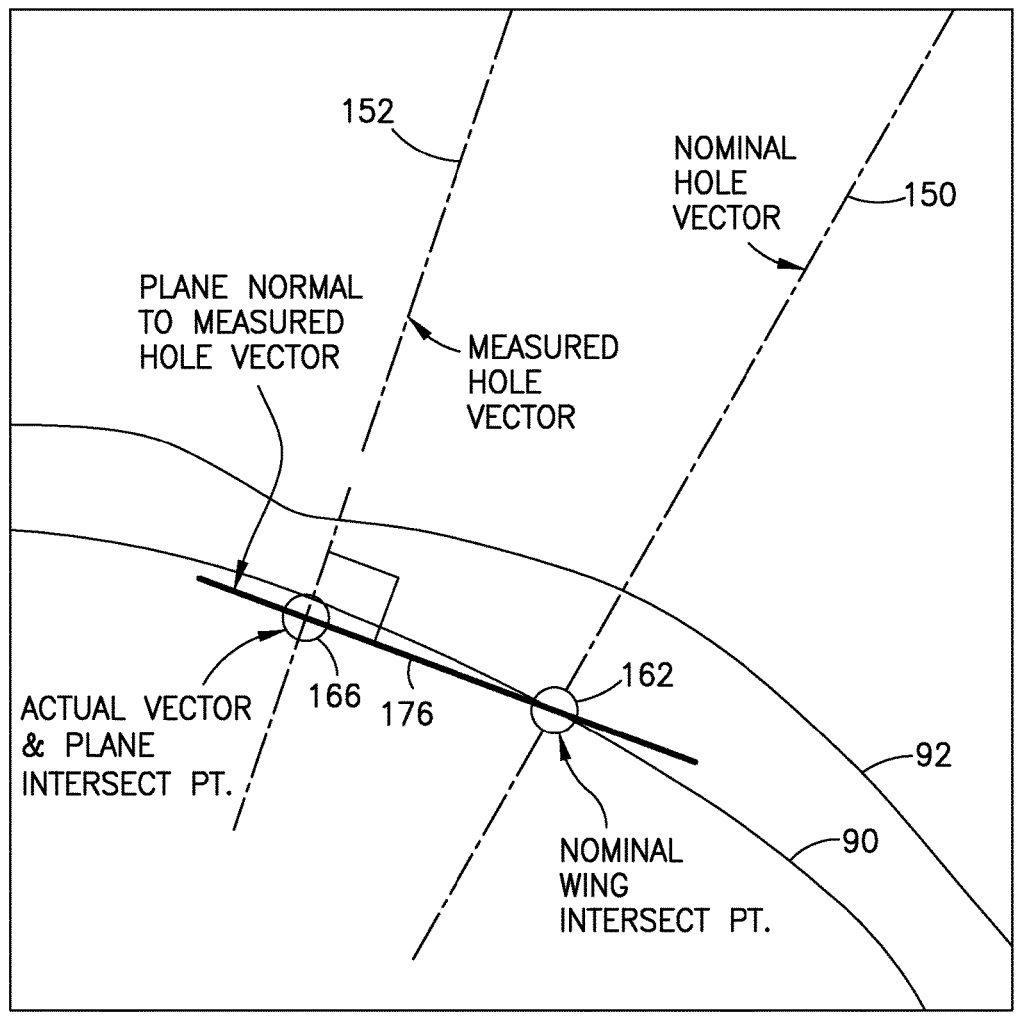
Figure 21C:
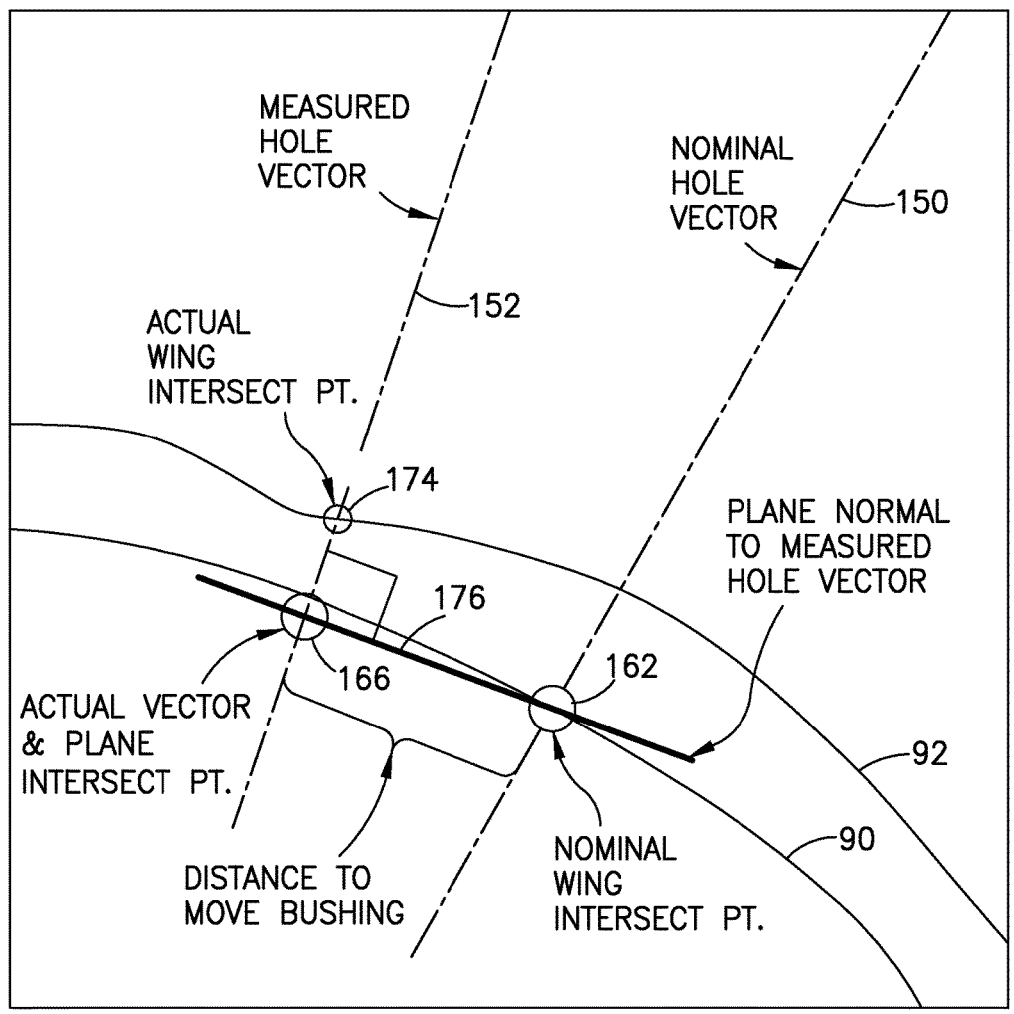
Figure 21D:
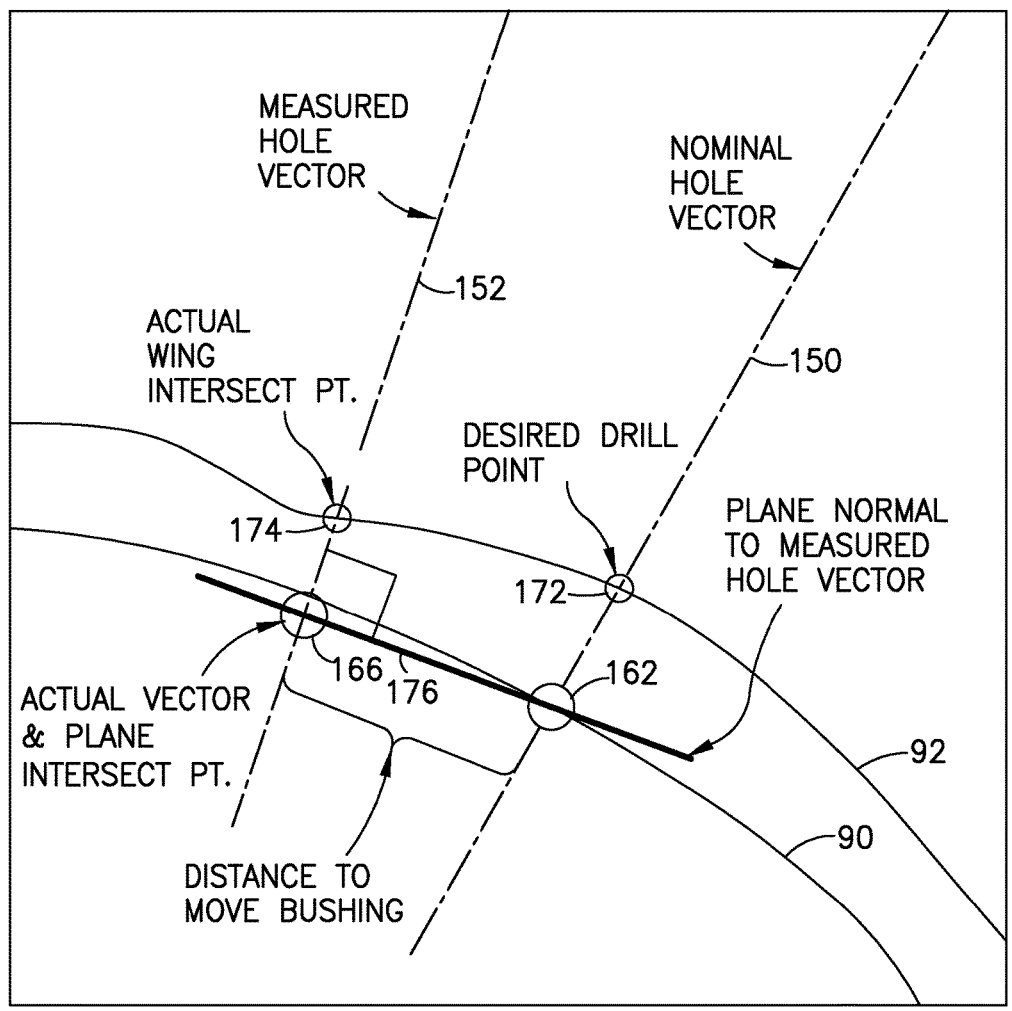
Figure 21E:
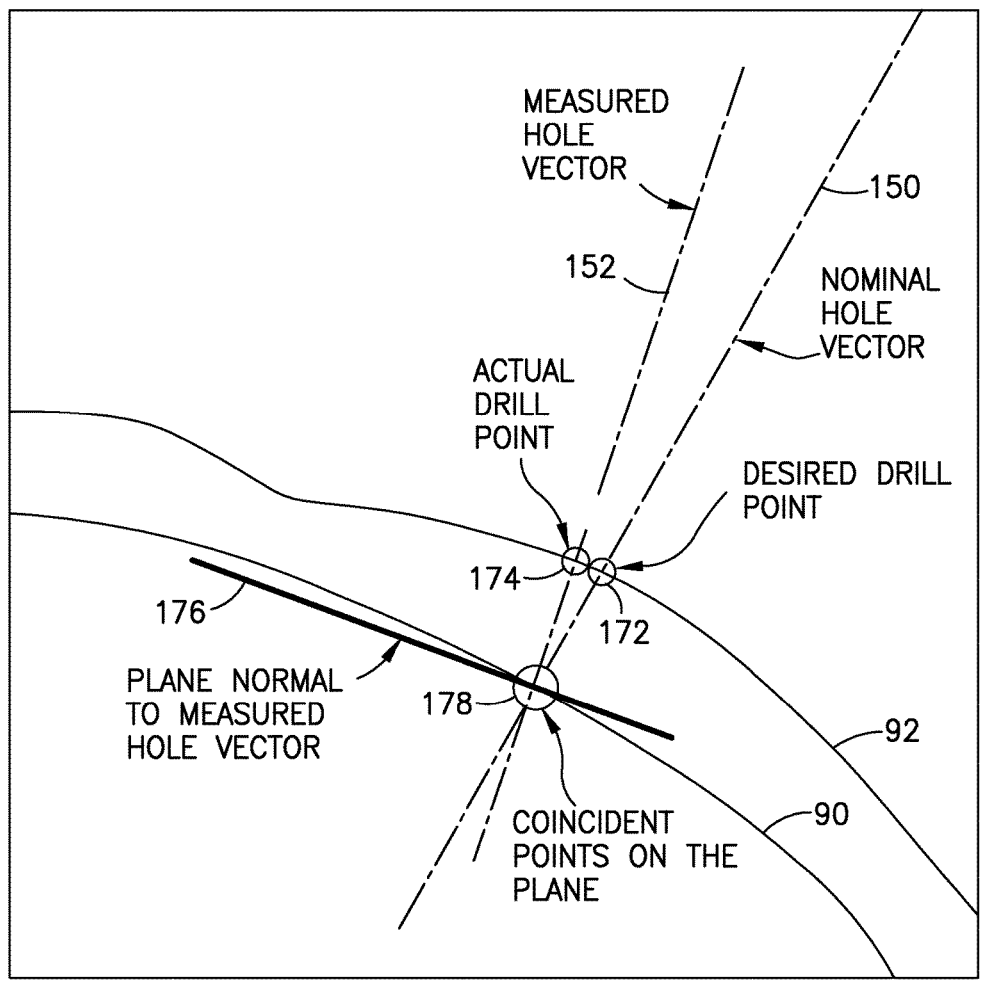

FIGS. 21A through 21E are graphical representations of calculations performed to find a new drill bushing location in accordance with an alternative embodiment. In this embodiment, the distance that the axis of the drill bushing (not shown) is moved is determined based on the point where the measured hole vector 152 intersects a plane that is normal to the measured hole vector 152 and may intersect the nominal wing surface 90 at a point which is offset from the nominal wing intersect point 162. FIG. 21A depicts the measured hole vector 152 and the nominal hole vector 150 intersecting the nominal wing surface 90 and the actual wing surface 92. A plane 176 normal to the measured hole vector 152 and intersecting the nominal wing intersect point 162 is then computed. That plane 176 is indicated by a bold straight line in FIG. 21B. The nominal wing intersect point 162 (where the nominal hole vector 150 intersects the nominal wing surface 90) and the actual vector and plane intersect point 166 (where the measured hole vector 152 intersects the plane 176) are indicated by large open circles in FIG. 21B. FIG. 21C shows the distance that the drill bushing will be moved, which corresponds to the distance separating the nominal wing intersect point 162 and the actual vector and plane intersect point 166. The path of the drill bushing will be normal to the measured hole vector 152 (i.e., parallel to the plane 176 in FIG. 21C). The actual wing intersect point 174 (corresponding to the intersection of the measured hole vector 152 with the actual wing surface 92) is indicated by a small open circle in FIG. 21C. The desired drill point 172, corresponding to the intersection of the nominal hole vector 150 and the actual wing surface 92, is indicated by a second small open circle in FIG. 21D. Finally, FIG. 21E shows the situation after the drill bushing has been moved by the computed distance, in which case both the measured and nominal hole vectors 152 and 150 intersect the nominal wing surface 90 at coincident points 178 on the plane 176. As can be seen in FIG. 21E, however, the actual drill point 174 is not coincident with the desired drill point 172, but within the specified tolerance.

Code can be used to determine the distance to move the axis of the drill bushing and encoder values. This code can be written with the plane normal to the nominal hole vector 150 (as shown in FIGS. 20A-F) to reduce the error of the actual drill point 174 on the measured wing surface 92, but code written with the plane 176 normal to the measured hole vector 152 (as shown in FIGS. 20A-E) will also work.

In accordance with the teachings disclosed above, the motor that drives rotation of the inner eccentric bushing is decoupled from the outer eccentric bushing, which allows one to keep the inner eccentric motor stationary. The inner eccentric bushing can be rotated by turning the worm wheel that is attached to the internal spur gear. This turns the external spur gear. Because the worm wheel and the external spur gear are concentric to the outside of the outer eccentric bushing, the motor that drives the inner eccentric bushing can be attached to the same stationary structure as the motor that drives the outer eccentric bushing. The system still has to do simple mathematics to remove the "backdriving" of the inner eccentric bushing as it orbits due to the motion of the outer eccentric bushing.

To make this design work properly, the gear diameters of the external spur gear and the internal spur gear, which drive the inner eccentric bushing, should be matched to the offset of the eccentric bushings. In one implementation, the eccentricity was about 0.2", which equated to approximately 0.1" per eccentric bushing. Since the difference in gear diameters is a direct relationship to the number of teeth on the gear, the difference in tooth counts between the external spur gear and the internal spur gear was chosen to suit the eccentricity. 48 diametrical pitch gears were chosen due to wide availability, which yielded a 10 tooth difference to achieve 0.208333 inch of eccentricity. The eccentricity was split between the two eccentrics in order to ensure proper gear mesh. As a result, the double eccentric positioner had a total radial reach of 0.208333 inch.

Another advantageous feature is the use of worm gears in order to lock the assembly in place, which allows the use of smaller motors without a brake. As a result, the positioner can be smaller.

Figure 22:
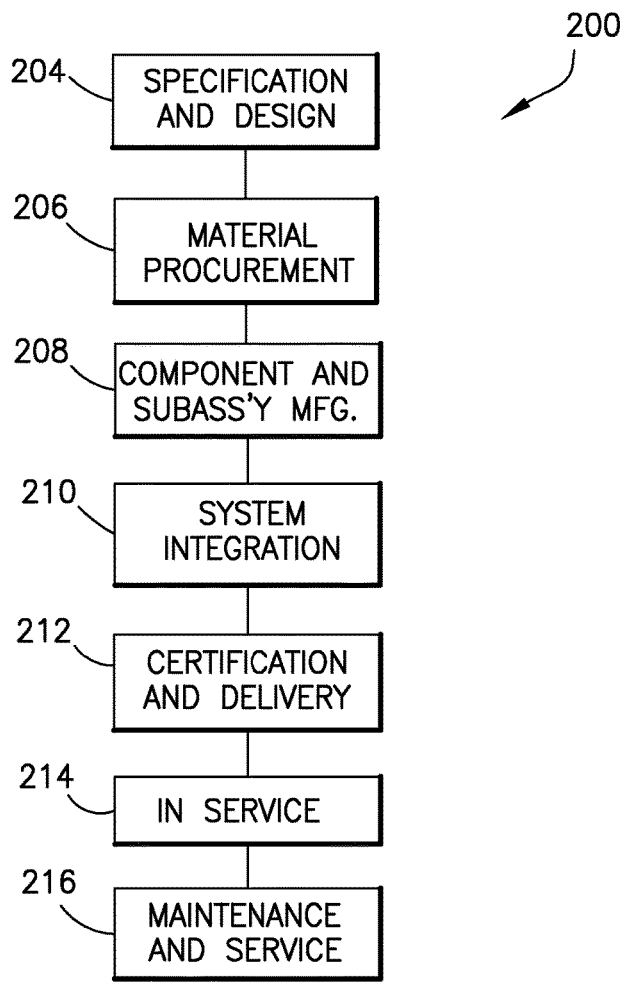
FIG. 22 is a flow diagram of an aircraft production and service methodology.
Figure 23:
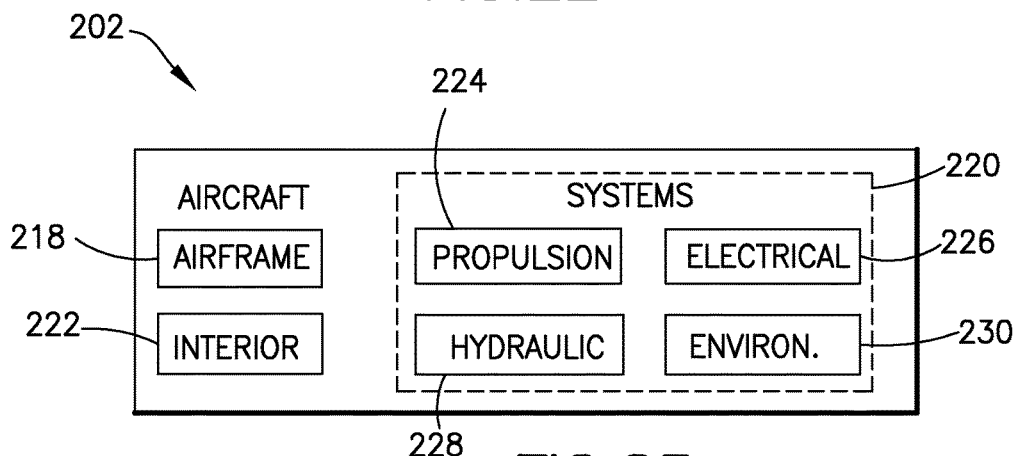
FIG. 23 is a block diagram showing systems of an aircraft.

The apparatus and method disclosed above may be employed in an aircraft manufacturing and service method 200 as shown in FIG. 22 for assembling an aircraft 202 as shown in FIG. 23. During pre-production, exemplary method 200 may include specification and design 204 of the aircraft 202 and material procurement 206. During production, component and subassembly manufacturing 208 and system integration 210 of the aircraft 202 takes place. System integration 210 includes, but is not limited to, the DA hole placement operations disclosed herein, Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 23, the aircraft 202 produced by exemplary method 200 may include an airframe 218 (including a fuselage and wing boxes) with a plurality of systems 220 and an interior 222. Examples of high-level systems 220 include one or more of the following: a propulsion system 224, an electrical system 226, a hydraulic system 226, and an environmental control system 230. Any number of other systems may be included. Holes may be drilled in wing boxes or other components using the methods disclosed herein. One or more apparatus embodiments, method embodiments or a combination thereof may be utilized during the system integration stage 210 for substantially expediting assembly of or reducing the cost of an aircraft 202.

While a DA hole placement methodology has been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used in the claims, the term "computer system" should be construed broadly to encompass a system having at least one computer or processor, and which may have multiple computers or processors that communicate through a network or bus. As used in the preceding sentence, the terms "computer" and "processor" both refer to devices having a processing unit (e.g., a central processing unit) and some form of memory (i.e., computer-readable medium) for storing a program which is readable by the processing unit.

The invention claimed is:

1. A system comprising:
   a double eccentric positioning apparatus having a hole with an axis, said double eccentric positioning apparatus comprising a first motor which operates in accordance with received first motor encoder counts and a second motor which operates in accordance with received second motor encoder counts;
   a vector target comprising a body supported by said double eccentric positioning apparatus, and first and second optical targets supported by said body, an axis of said first and second optical targets being coaxial with said axis of said double eccentric positioning apparatus;
   an optical coordinate measuring machine operable to measure coordinates of a measured hole vector based in part on light received from said first and second optical targets, said measured hole vector representing a location of said axis of said double eccentric positioning apparatus in a global coordinate system; and
   a computer system programmed to perform the following operations:
   convert the location of said axis of said double eccentric positioning apparatus in said global coordinate system into a location of said axis of said double eccentric positioning apparatus in a bushing coordinate system;
   computing a distance to move said axis of said double eccentric positioning apparatus in said bushing coordinate system; and
   converting said distance into said first and second motor counts.

2. The system as recited in claim 1, wherein said computer system is programmed to compute a distance separating a nominal wing intersect point and an actual vector and plane intersect point, wherein said nominal wing intersect point represents an intersection of a nominal hole vector and a nominal wing surface, and said actual vector and plane intersect point represents an intersection of said measured hole vector and a plane normal to said nominal hole vector that intersects said nominal wing intersect point.

3. The system as recited in claim 1, wherein said computer system is programmed to compute a distance separating a nominal wing intersect point and an actual vector and plane intersect point, wherein said nominal wing intersect point represents an intersection of said nominal hole vector and a nominal wing surface, and said actual vector and plane intersect point represents an intersection of said measured hole vector and a plane normal to said measured hole vector that intersects said nominal wing intersect point.

4. The system as recited in claim 1, further comprising:
   a base plate that supports said double eccentric positioning apparatus; and
   a clamping device for clamping said base plate to a workpiece.

5. The system as recited in claim 1, wherein said double eccentric positioning apparatus comprises:
   an outer eccentric bushing having an outer circular cylindrical surface and an inner circular cylindrical surface off-center from said outer circular cylindrical surface of said outer eccentric bushing;
   means for coupling said outer eccentric bushing to said first motor;
   an inner eccentric bushing having an outer circular cylindrical surface in contact with said inner circular cylindrical surface of said outer eccentric bushing and an inner circular cylindrical surface off-center from said outer circular cylindrical surface of said inner eccentric bushing; and
   means for coupling said inner eccentric bushing to said second motor.

6. The system as recited in claim 5, wherein offsets of said inner and outer eccentric bushings are equal.

7. A method of positioning a drill bushing in overlying relationship with a nominal drillhole location on a workpiece, comprising:
   installing a drill bushing in a double eccentric positioning apparatus so that an axis of the drill bushing is coaxial with an axis of the double eccentric positioning apparatus;
   positioning the double eccentric positioning apparatus on a workpiece at a location where a nominal drill hole location lies within a range of movement of the axis of the double eccentric positioning apparatus; and
   controlling the double eccentric positioning apparatus so that the axis of the double eccentric positioning apparatus moves closer to the nominal drillhole location.

8. The method as recited in claim 7, wherein said controlling step is performed by a computer system programmed to output first and second motor encoder counts that cause the axis of the double eccentric positioning apparatus to move closer to the nominal drillhole location.

9. The method as recited in claim 8, wherein an outer eccentric bushing of the double eccentric positioning apparatus is rotated a first angle proportional to said first motor encoder count, and an inner eccentric bushing of the double eccentric positioning apparatus is rotated a second angle proportional to said second motor encoder count.

10. The method as recited in claim 8, further comprising:
   (a) installing a vector target in the drill bushing, the vector target comprising first and second optical targets, an axis of the first and second optical targets being coaxial with the axis of the double eccentric positioning apparatus;
   (b) measuring coordinates of a measured hole vector based in part on light transmitted toward and reflected from the first and second optical targets, said measured hole vector representing a location of the axis of the double eccentric positioning apparatus in a global coordinate system;
   (c) converting the location of the axis of the double eccentric positioning apparatus in said global coordinate system into a location of the axis of the double eccentric positioning apparatus in a bushing coordinate system;
   (d) computing a distance to move the axis of the double eccentric positioning apparatus in the bushing coordinate system; and
   (e) converting said distance into said first and second motor encoder counts,
   wherein steps (c) through (e) are performed by the computer system.

11. A method of positioning a drill bushing, comprising:
   (a) applying a drill jig to a wing surface;
   (b) using a metrological tool to measure a home location of an adjustable bushing attached to the drill jig;
   (c) using metrology data to determine a desired location of the adjustable bushing; and
   (d) moving the adjustable bushing from the home location to the desired location while the drill jig remains stationary, wherein step (b) comprises:
moving the adjustable bushing to the home position;
installing optical targets in the adjustable bushing;
placing scale bars and supporting optical targets on the wing surface;
acquiring metrology data using a camera which is directed at the drill jig;
processing the metrology data; and
computationally extracting a measured hole vector from the metrology data, said measured hole vector intersecting the optical targets installed in the adjustable bushing.

12. The method as recited in claim 11, wherein step (c) comprises:
virtually intersecting the measured hole vector with an engineering nominal wing surface; and
computing a distance from the virtual intersection of the measured hole vector with the engineering nominal wing surface to a nominal intersection point, and
wherein step (d) comprises:
moving the adjustable bushing a distance equal to the computed distance from the virtual intersection of the measured hole vector with the engineering nominal wing surface to the nominal intersection point.

* * * * *